United States Patent
Thakker et al.

(10) Patent No.: US 12,537,096 B1
(45) Date of Patent: Jan. 27, 2026

(54) DATA-DRIVEN DESCRIPTIVE AND PRESCRIPTIVE ANALYTICS FOR MEDICAL DEVICES

(71) Applicant: Medtronic, Inc., Minneapolis, MN (US)

(72) Inventors: Deepak R. Thakker, Plymouth, MN (US); Annette Mittlemark Koch, Shoreview, MN (US); Shihe Ma, Plymouth, MN (US); James A. Crump, Minneapolis, MN (US); Sean Larson, Edina, MN (US); James E. Willenbring, St. Paul, MN (US)

(73) Assignee: Medtronic, Inc., Minneapolis, MN (US)

( * ) Notice: Subject to any disclaimer, the term of this patent is extended or adjusted under 35 U.S.C. 154(b) by 765 days.

(21) Appl. No.: 17/075,202

(22) Filed: Oct. 20, 2020

Related U.S. Application Data

(60) Provisional application No. 62/923,910, filed on Oct. 21, 2019.

(51) Int. Cl.
*G16H 40/40* (2018.01)
*G16H 10/60* (2018.01)
*G16H 40/67* (2018.01)
*G16H 50/20* (2018.01)
*G16H 50/70* (2018.01)

(52) U.S. Cl.
CPC .......... *G16H 40/40* (2018.01); *G16H 10/60* (2018.01); *G16H 40/67* (2018.01); *G16H 50/20* (2018.01); *G16H 50/70* (2018.01)

(58) Field of Classification Search
CPC ........ G16H 40/40; G16H 10/60; G16H 40/67; G16H 50/20; G16H 50/70
USPC .......................................................... 705/2–3
See application file for complete search history.

(56) References Cited

U.S. PATENT DOCUMENTS

| | | | | |
|---|---|---|---|---|
| 5,583,758 A | * | 12/1996 | McIlroy | G16H 50/20 705/2 |
| 5,786,816 A | * | 7/1998 | Macrae | G16H 40/60 128/920 |
| 5,860,917 A | | 1/1999 | Comanor et al. | |

(Continued)

FOREIGN PATENT DOCUMENTS

WO     WO 2020154370     7/2020

OTHER PUBLICATIONS

Amend, How Does Sacral Modulation Work Best? Placement and Programming Techniques to Maximize Efficacy, 2011, Curr Urol Rep 12, 327-335 (Year: 2011).*

*Primary Examiner* — Mark Holcomb
*Assistant Examiner* — Tran N Nguyen
(74) *Attorney, Agent, or Firm* — Husch Blackwell LLP

(57) ABSTRACT

Systems and methods for dynamic prediction related to a medical device. A system includes a predictor including computing hardware of at least one processor and memory for the at least one processor; and instructions that, when executed on the predictor, cause the predictor to implement: an input/output engine to receive data from a plurality of distributed data sources, an aggregation engine to assemble the data received by the input/output engine, a prediction engine to generate a prediction based on a benchmark assessment related to the medical device, and an alerting engine to communicate an alert based on the prediction.

17 Claims, 16 Drawing Sheets

(56) References Cited

U.S. PATENT DOCUMENTS

| | | | |
|---|---|---|---|
| 6,735,479 B2* | 5/2004 | Fabian | A61B 5/0031 |
| | | | 128/903 |
| 7,367,956 B2 | 5/2008 | King | |
| 8,095,384 B2 | 1/2012 | Firminger et al. | |
| 8,560,281 B2 | 10/2013 | Soto et al. | |
| 9,934,361 B2 | 4/2018 | Yao et al. | |
| 10,332,624 B2* | 6/2019 | Berdia | G16H 10/60 |
| 10,650,920 B2 | 5/2020 | Moturu et al. | |
| 2001/0023360 A1* | 9/2001 | Nelson | G16H 40/67 |
| | | | 607/60 |
| 2001/0031997 A1* | 10/2001 | Lee | A61B 5/0002 |
| | | | 607/59 |
| 2003/0135128 A1 | 7/2003 | Suffin et al. | |
| 2004/0049244 A1* | 3/2004 | Cao | G16H 40/67 |
| | | | 607/60 |
| 2004/0111291 A1* | 6/2004 | Dust | G16H 40/20 |
| | | | 705/2 |
| 2006/0122660 A1* | 6/2006 | Boveja | A61N 1/3605 |
| | | | 607/40 |
| 2007/0244724 A1 | 10/2007 | Pendergast et al. | |
| 2008/0133290 A1* | 6/2008 | Siegrist | G16H 40/20 |
| | | | 705/2 |
| 2009/0172773 A1* | 7/2009 | Moore | G06F 16/958 |
| | | | 705/2 |
| 2010/0287001 A1 | 11/2010 | Pearce et al. | |
| 2010/0312798 A1* | 12/2010 | Dutta | G16H 50/70 |
| | | | 707/E17.014 |
| 2012/0047105 A1* | 2/2012 | Saigal | G16Z 99/00 |
| | | | 706/54 |
| 2017/0091410 A1* | 3/2017 | McCullough | G16H 10/60 |
| 2018/0344308 A1* | 12/2018 | Nawana | G16H 70/20 |
| 2019/0008461 A1* | 1/2019 | Gupta | G06N 5/01 |
| 2019/0147141 A9 | 5/2019 | Kahn | |
| 2020/0108260 A1* | 4/2020 | Haddad | G16H 20/30 |
| 2021/0316145 A1* | 10/2021 | Offutt | A61B 5/202 |

\* cited by examiner

| Data source | Estimate | Std Error | Chi Sq | Odds Ratio [95% Interval] | Pr>ChiSq |
|---|---|---|---|---|---|
| Intercept | -4.6898 | 0.1478 | 1007.4 | N/A | <0.0001 |
| Patient's maximum rating for function of current implant | 0.802 | 0.015 | 2878.3 | 2.23 [2.1656 – 2.2963] | <0.0001 |
| Physician's Post Performance Rating for patient's current implant (Fair/Average/Good) | 2.9551 | 0.1071 | 761.23 | 19.2043 [15.5878 – 23.6901] | <0.0001 |
| Type of FV (if Advanced) | 0.3121 | 0.0206 | 230.31 | 1.8667 [1.7221 – 2.0234] | <0.0001 |
| Physician's estimate of usefulness (Great Arg Advanced) | 0.0047 | 0.0007 | 39.29 | 1.0047 [1.0032 – 1.0051] | <0.0001 |
| Patient Equipped with Supplemental Hearing Impl. | -0.1373 | 0.0235 | 34.27 | 0.7598 [0.6931 – 0.833] | <0.0001 |
| Patient Age | -0.0068 | 0.0012 | 34.21 | 0.9933 [0.991 – 0.9955] | <0.0001 |
| Patient Family History | 0.1042 | 0.0194 | 28.97 | 1.1316 [1.1416 – 1.3286] | <0.0001 |
| Total time spent since implant use | -0.0473 | 0.0114 | 17.15 | 0.9538 [0.9327 – 0.974] | <0.0001 |
| Physician's rating of the implantation experience | -0.0146 | 0.0037 | 15.31 | 0.9855 [0.9783 – 0.9927] | <0.0001 |

FIG. 5

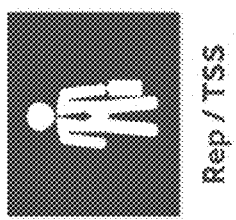
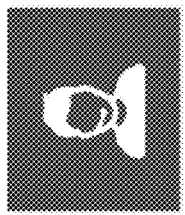
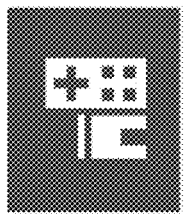
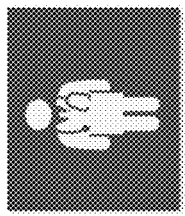
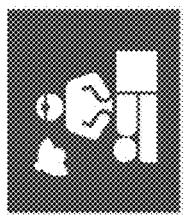
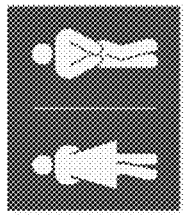
FIG. 7

| Outcome Variable | Example | Regression Type | Regression Equation |
|---|---|---|---|
| Continuous | Physician volume of evaluations | Linear | Outcome (Y) = $\beta_0 + \beta_1 \cdot$ Variable (X) |
| Categorical | Patient received the implant (Yes / No) | Logistic | Log (Odds of Outcome) = $\beta_0 + \beta_1 \cdot$ Variable (X) |

FIG. 8

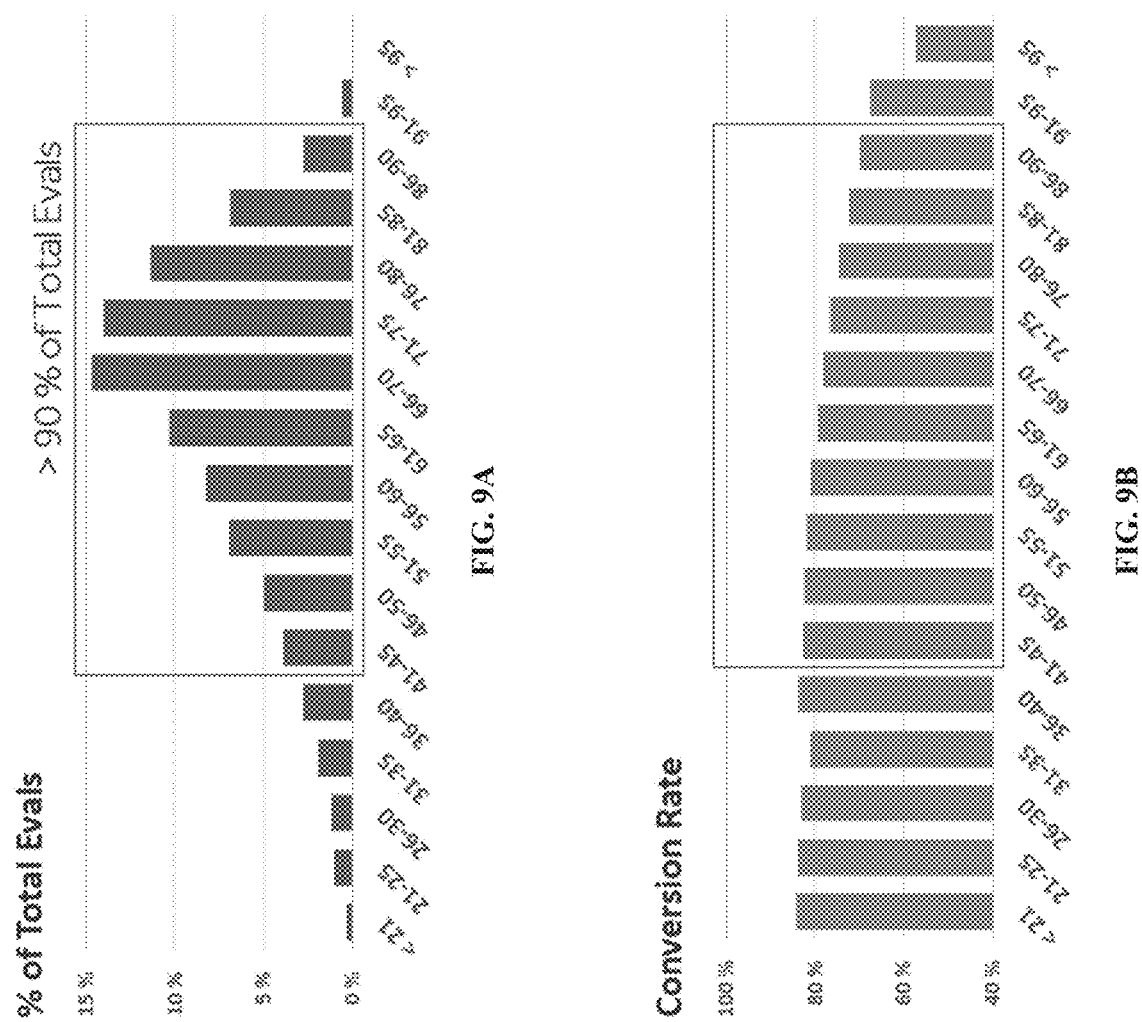

| Parameter | Estimate | Standard Error | Wald Chi Squared | Odds Ratio | Odds Ratio 95% Confidence Limits | | Pr > Chi Sq |
|---|---|---|---|---|---|---|---|
| Intercept | 1.7473 | 0.1971 | 78.6107 | | | | <.0001 |
| Field team has followed up with the patient and documented notes in nLink [No note] | -1.1452 | 0.0227 | 2548.833 | 0.318 | 0.304 | 0.333 | <.0001 |
| Patient has a documented referral [No referral] | -0.6329 | 0.0439 | 207.6749 | 0.531 | 0.487 | 0.579 | <.0001 |
| Type of Trial [Evolve] | 0.1767 | 0.022 | 64.4143 | 1.193 | 1.143 | 1.245 | <.0001 |
| Patient has a complaint within the first 40 days of the trial start [No Complaint] | -2.867 | 0.1754 | 265.4403 | 0.057 | 0.04 | 0.08 | <.0001 |
| Physician's past performance on trial success (3 year count of Successful trials / Total trials) | 3.5003 | 0.0939 | 1389.887 | 33.127 | 27.571 | 39.837 | <.0001 |
| Treating physician's volume (3 year average annual # of trials | 0.00265 | 0.000621 | 18.2868 | 1.003 | 1.001 | 1.004 | <.0001 |
| Years of experience of supporting Rep | 0.00981 | 0.00194 | 25.4597 | 1.01 | 1.006 | 1.014 | <.0001 |
| Years of experience of supporting Clinical Specialist | -0.00442 | 0.00188 | 5.5151 | 0.996 | 0.992 | 0.999 | 0.0189 |

FIG. 16

DATA-DRIVEN DESCRIPTIVE AND PRESCRIPTIVE ANALYTICS FOR MEDICAL DEVICES

CROSS-REFERENCE TO RELATED APPLICATION

This application claims the benefit of U.S. Provisional Application No. 62/923,910, filed Oct. 21, 2019, which is fully incorporated by reference herein.

FIELD

The present disclosure is generally related to medical devices, and more particularly, to healthcare informatics for medical devices.

BACKGROUND

In healthcare environments, data is typically siloed. For example, patient and patient device data is often contained in one repository or on a particular set of devices, clinic and professional data is often contained in another, separate repository or set of devices, device representative or therapy specialist data is often contained in yet another, separate repository or set of devices, and support data can be contained in yet another, separate repository or set of devices. Each of these repositories and devices traditionally supports a single application (e.g. patient, clinic, specialist, assistance, etc.) There is often very little integration between siloed repositories. As a result, inter-silo patterns are not detected.

In a particular example, urinary and fecal incontinence (e.g., an inability to control bladder and bowel function, respectively) are problems that afflict people of all ages, genders, and races. Various muscles, nerves, organs and conduits within the pelvic floor cooperate to collect, store and release bladder and bowel contents. A variety of disorders may compromise urinary tract and bowel performance, and contribute to incontinence. Many of the disorders may be associated with aging, injury, or illness.

Urinary incontinence, such as, urgency incontinence, may originate from disorders of portions of the peripheral or central nervous system which control the bladder micturition reflex. Nerve disorders may also lead to overactive bladder activities and/or may prevent proper triggering and operation of the bladder. Furthermore, urinary incontinence may also result from improper communication between the nervous system and the urethra.

Sacral nerve stimulation (also referred to as sacral neuromodulation (SNM) or electrical stimulation of the sacral nerve) can be utilized to manage urinary incontinence, fecal incontinence, and/or other similar conditions.

To evaluate a patient for a sacral neuromodulation device, an initial basic evaluation is conducted. Typically, a test lead with a temporary stimulator is implanted in the patient for a duration of up to one week. Then, depending on whether the patient experiences relief, the patient may go on to have an advanced evaluation or permanent implant. However, many initial evaluations are inconclusive. Inconclusive determinations are often based on a single silo of data-patient device data-when myriad other data is available in other silos that can relate to the predicted effectiveness of a permanent implant. Often, initial evaluation patients with an inconclusive evaluation do not go on to have an advanced evaluation, when many more patients could benefit from such devices. Therefore, there is a need for descriptive and predictive analytics to aid in patient trial-to-implant conversion.

Further, problems exist in managing therapy for sacral neuromodulation devices. For example, when a patient is driving, the patient might turn the device off and then forget to turn it back on. Traditionally, the device may just remain off, without communicating its status to the patient or any other components of the system. As a result, the patient can be without the therapy provided by the device, sometimes indefinitely. Therefore, there is a further need for therapy improvements using inter-silo data.

SUMMARY

The techniques of this disclosure generally relate to descriptive and predictive analytics to identify factors, relating to, for example, the patient, procedure, physician, clinic setting, field resources involved, patient services, etc. that are statistically significantly and meaningfully-correlated with patient trial-to-implant conversion, as well as therapy prediction.

In one aspect, the present disclosure provides a system for dynamic prediction for a medical device, the system comprising: a predictor including computing hardware of at least one processor and memory operably coupled to the at least one processor; and instructions that, when executed on the predictor, cause the predictor to implement: an input/output engine configured to receive data from a plurality of distributed data sources, an aggregation engine configured to assemble the data received by the input/output engine, a prediction engine configured to generate a prediction based on a benchmark assessment related to the medical device, and an alerting engine configured to communicate an alert based on the prediction.

In another aspect of the aforementioned system, the prediction is a likelihood of a patient receiving a therapy implant.

In another aspect of the aforementioned system, the prediction is a therapy improvement for a patient.

In another aspect of the aforementioned system, the medical device is a Sacral NeuroModulation (SNM) therapy.

In another aspect, the disclosure provides a method for dynamic prediction for a medical device, the method comprising: assembling data from a plurality of distributed data sources and at a plurality of stages of a patient evaluation with a Sacral NeuroModulation (SNM) therapy; generating a dynamic prediction based on a benchmark assessment related to the SNM therapy to determine a likelihood of a patient receiving a permanent SNM therapy implant; and recommending a treatment plan based on the dynamic prediction.

In another aspect of the aforementioned method, assembling data further comprises recording patient symptom data by a patient in a patient database, recording patient symptom data by a support link agent in a support link database, and recording patient symptom by a therapy support representative in a therapy support database.

In another aspect of the aforementioned method, patient symptom data further comprises patient perception of symptom relief.

In another aspect of the aforementioned method, assembling data further comprises computing a delta for symptoms based on the patient symptom data and the patient perception of symptom relief.

In another aspect of the aforementioned method, wherein generating the dynamic prediction further comprises when an improvement in symptoms compared to the benchmark assessment is less than 50% for any day in the patient evaluation, determining the treatment plan is unlikely to include the permanent SNM therapy implant.

In another aspect of the aforementioned method, recommending a treatment plan further comprises adjusting at least one of a therapy program, a therapy amplitude, or a component of current therapy.

In another aspect of the aforementioned method, generating the dynamic prediction further comprises when an improvement in symptoms compared to the benchmark assessment is less than 50% for a subset of days in the patient evaluation, determining the treatment plan is unlikely to include the permanent SNM therapy implant.

In another aspect of the aforementioned method, recommending a treatment plan further comprises recommending an advanced evaluation.

In another aspect of the aforementioned method, generating the dynamic prediction further comprises when an improvement in symptoms compared to the benchmark assessment is greater than 50%, determining the treatment plan is likely to include the permanent SNM therapy implant.

In another aspect, the disclosure provides a system for dynamic prediction for a medical device, the system comprising: a predictor processor configured to assemble data from a plurality of distributed data sources and at a plurality of stages of a patient evaluation with a Sacral NeuroModulation (SNM) therapy; and a predictor database configured to store the data assembled by the predictor processor; and wherein the predictor processor is further configured to determine a delta for improvement in patient symptoms based on the data in the predictor database, generate a dynamic assessment based on the delta, and generate an alert based on the dynamic assessment.

In another aspect of the aforementioned system, one of the plurality of distributed data source is a patient data silo, and the system further comprises a digital health processor configured to receive data from the patient data silo; and a digital health database configured to store data received from the patient data silo.

In another aspect of the aforementioned system, one of the plurality of distributed data source is a healthcare data silo, and the system further comprises an electronic medical record (EMR) processor configured to receive data from the healthcare data silo; and an EMR database configured to store the data received from the healthcare data silo.

In another aspect of the aforementioned system, one of the plurality of distributed data source is a support data silo, and the system further comprises a support link customer relationship management (CRM) processor configured to receive data from the support data silo; and a support link CRM database configured to store the data received from the support data silo.

In another aspect of the aforementioned system, one of the plurality of distributed data source is a therapy data silo, and the system further comprises a therapy processor configured to receive data from the therapy data silo; and a therapy database configured to store the data received from the therapy data silo.

In a feature and advantage of embodiments, a predictor can utilize system data to predict or match a benchmark. Further, a predictor can facilitate recommendations or alerts. More particularly, data from distributed data sources can be utilized to predict patient trial-to-implant conversion.

In another feature and advantage of embodiments, therapy improvements are made. Patient device data can be augmented or supplemented with data across a plurality of distributed data sources (and sometimes years' worth of data) to match use cases and recommend therapy improvements for a patient device.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 5 is a table of data sources and corresponding prediction variables for a particular prediction algorithm for a medical device, according to an embodiment.

FIG. 7 is a block diagram of input sources shown as players throughout the evaluation-to-implant process, according to an embodiment.

FIG. 8 is a table depicting example regression calculations, according to an embodiment.

FIG. 9A is a graph of percent of total evaluations against patient age group, according to an embodiment.

FIG. 9B is a graph of conversion rates against patient age group, according to an embodiment.

FIG. 16 is a table of model parameters and corresponding prediction variables for a particular prediction algorithm for a medical device related to pain management, according to an embodiment.

DETAILED DESCRIPTION

Figure 1:
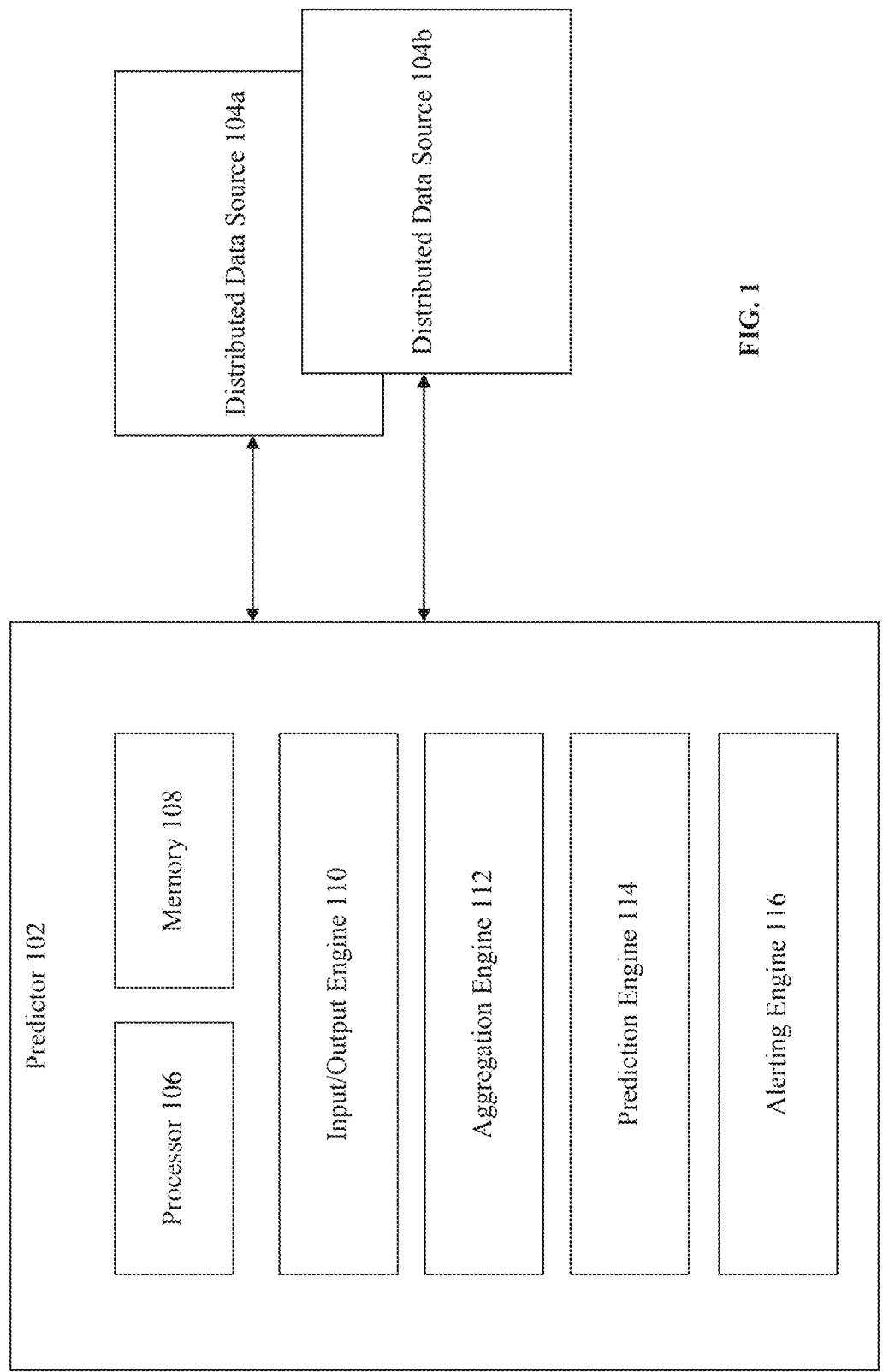
FIG. 1 is a block diagram of a system for dynamic prediction for a medical device, according to an embodiment.

Referring to FIG. 1, a block diagram of a system 100 for dynamic prediction for a medical device is depicted, according to an embodiment. System 100 generally comprises a predictor 102 and a plurality of distributed data sources 104.

Some of the subsystems of system 100 include various engines or tools, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Predictor 102 generally comprises a processor 106 and a memory 108, and a plurality of engines, such as input/output engine 110, aggregation engine 112, prediction engine 114, and alerting engine 116, as depicted in FIG. 1. The engines of predictor 102 are depicted for ease of explanation on a single server. However, as described above, input/output engine 110, aggregation engine 112, prediction engine 114, and alerting engine 116, can be implemented on several servers, device, clouds, or networks.

Processor 106 can be any programmable device that accepts digital data as input, is configured to process the input according to instructions or algorithms, and provides results as outputs. In an embodiment, processor 106 can be a central processing unit (CPU) configured to carry out the instructions of a computer program. Processor 106 is therefore configured to perform at least basic arithmetical, logical, and input/output operations.

Memory 108 can comprise volatile or non-volatile memory as required by the coupled processor 106 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of embodiments.

Input/output engine 110 is configured to interface with the plurality of distributed data sources 104. In an embodiment, input/output engine 110 can be configured for specialized communication with each of the plurality of distributed data sources 104a, 104b. In embodiments, when a new distributed data source 104 is added to system 100, input/output engine 110 is dynamically configured for communication with the new distributed data source 104 by detecting the source and automatically conducting handshaking with the source, including defining rules for the way data is to be shared (e.g. protocol, transfer rate, coding alphabet, parity, interrupt procedure, etc.).

In an embodiment, input/output engine 110 is configured to store data received from distributed data sources 104a, 104b in memory 108. In other embodiments, input/output engine 110 can be configured to store data received from distributed data sources 104a, 104b in a general purpose database management storage system (DBMS) or relational DBMS as implemented by, for example, Oracle, IBM DB2, Microsoft SQL Server, PostgreSQL, MySQL, SQLite, Linux, or Unix solutions, in embodiments (not shown in FIG. 1 for ease of explanation).

Aggregation engine 112 is configured to execute the function or set of functions to assemble, aggregate, or otherwise prepare data stored in memory 108 (or similar database) received by input/output engine 110. In embodiments, aggregation engine 112 can normalize data to more easily compare data from the different distributed data sources 104.

Prediction engine 114 is configured to execute the function or set of functions to evaluate the assembled, aggregated, or otherwise prepared (and normalized, where appropriate) data and generate a prediction and/or benchmark assessment for the likelihood of a patient receiving a therapy implant post-evaluation. In an embodiment, prediction engine 114 is further configured to generate a prediction on how therapy can be improved for a particular patient or particular medical device.

Alerting engine 116 is configured to execute the function or set of functions to generate a recommendation or alert to maximize a patient's likelihood of benefiting from the evaluation(s) conducted by prediction engine 114. Alerting engine 116 can utilize input/output engine 110 to transmit an alert, message, or other communication to a patient or patient device. For example, alerting engine 116 can notify a therapy specialist that the patient would benefit from a therapy implant. In another example, alerting engine 116 can notify a patient to change the patient's particular therapy with an existing device.

Distributed data sources 104a, 104b can comprise a database or device tailored to a particular set of data, such as patient data and patient device data, clinic and professional data, device representative or therapy specialist data, or support data.

Figure 2:
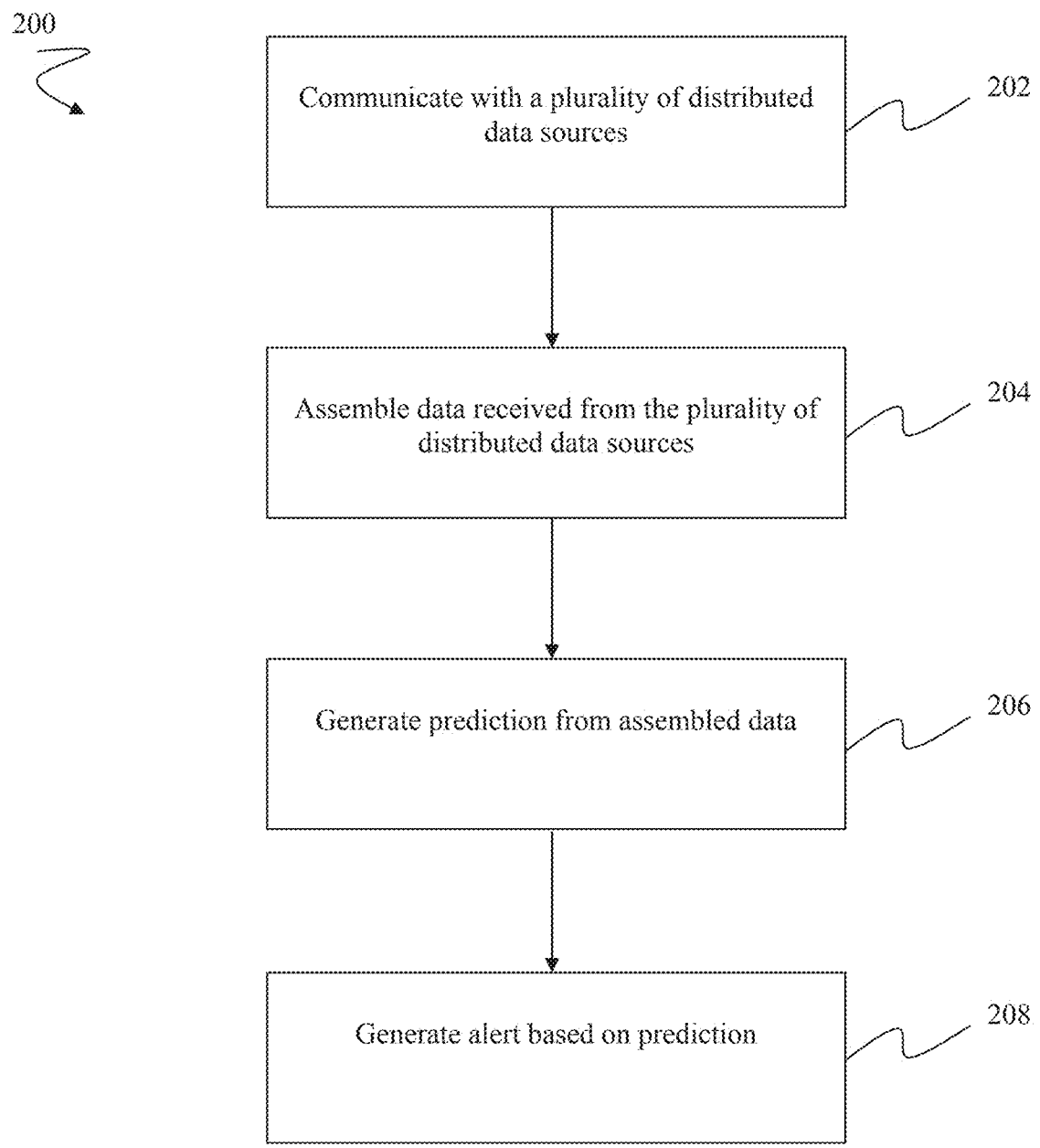
FIG. 2 is a flowchart of a method for dynamic prediction for a medical device, according to an embodiment.

Referring to FIG. 2, a flowchart of a method 200 for dynamic prediction for a medical device is depicted, according to an embodiment. In an embodiment, method 200 can be implemented by, for example, system 100.

At 202, communication is made with a plurality of distributed data sources. For example, referring also to FIG. 1, input/output engine 110 of predictor 102 can asynchronously receive data from distributed data sources 104a, 104b. In another embodiment, input/output engine 110 can request data from distributed data sources 104a, 104b. In an embodiment, at 202, data received by input/output engine 110 can be stored in memory 108.

At 204, data from the plurality of distributed data sources is assembled. For example, aggregation engine 112 of predictor 102 can assemble the required data. In an embodiment, aggregation engine 112 can assemble data intended to answer a particular query, question, or target, such as whether the patient would benefit from a trial-to-implant conversion (as guided, for example, by prediction engine 114). In other embodiments, aggregation engine 112 can assemble all data related to a particular patient, device, environment, etc. for subsequent benchmarking and prediction by prediction engine 114 without explicit guidance from another engine, but based on, for example, a standing rule to assemble such data.

At 206, a prediction is generated from the assembled data. In an embodiment, prediction engine 114 can compare the assembled data to a benchmark and determine whether the patient is likely to receive a post-evaluation implant.

In another embodiment, prediction engine 114 can compare the assembled data to one or more benchmarks to improve therapy for trial or permanent device. A benchmark can be a plurality of variables to evaluate the performance of the device.

For example, therapy can be improved by providing alerts to various stakeholders to verify whether it was intentional that the patient's therapy device was detected as turned off over a pre-defined (e.g., 24 hours) duration of time. In this example, the benchmark is the 24 hour therapy off status. In embodiments, alerts can be provided to the authorized rep/TSS via an app, to a Support Link agent in the Support Link CRM system, to the patient's HCP in the clinic EMR, and/or to the patient through the patient's smartphone. The alert can also include a link to an educational video that can help the patient identify the issue and turn the therapy stimulation back on.

In another example, therapy can be improved by optimizing therapy battery charge consumption by customizing the "stimulation on" time for the patient. In this example, a benchmark can be only when his/her symptoms dominantly show up at a certain state (e.g., when the patient is awake), and/or after a certain duration of time has passed since the patient's last symptom was manually/automatically recorded, and the patient is known to experience another symptom soon, based on prior artificial intelligence-based learning of the patient's symptom profile.

At 208, an alert is generated based on the prediction. For example, alerting engine 116 can transmit a notification to a care provider or device representative that the device patient would benefit from a permanent implant.

In another example, to improve patient care, alerting engine 116 can transmit an alert or notification to a patient device, to the patient's smartphone, or even to another care provider or device representative. In the example where a device is detected "off," an alert can ask whether the device modification was intentional (e.g. "you turned your device off for a long duration of time"). In response, the patient can be sent a reminder to turn the device "on." In an embodiment, a link to educational video on how to remedy the issue (such as how to turn the device "on" or switch the device to an appropriate mode) can be appended to the alert.

In an embodiment, the alert can be triggered based on certain detected symptoms, operation, or various parameters. For example, if the patient is known to be sleeping, an alert is ignored, but is transmitted when the patient is known to be awake. In embodiments, the amplitude of various parameters is considered to customize alerts. For example, if the device is detected "off" for a few hours, no alert is sent. But, if the device is detected "off" for a day, an alert can be sent.

Figure 3:
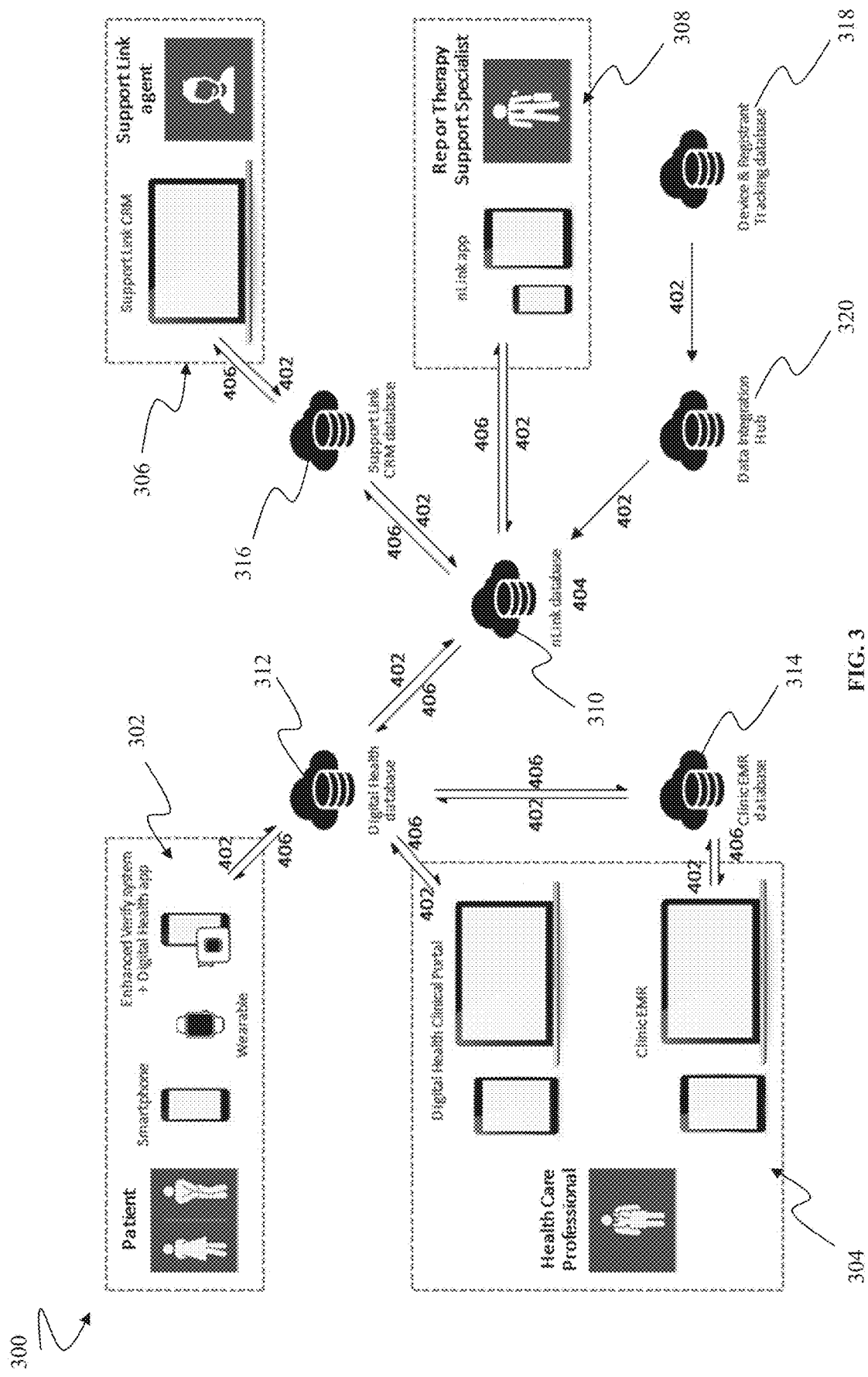
FIG. 3 is a block diagram of a system for dynamic prediction for a medical device, according to an embodiment.

Referring to FIG. 3, a block diagram of a system 300 for dynamic prediction for a medical device is depicted, according to an embodiment. For ease of explanation, element numbers are also provided for the example operation of system 300 depicted in FIG. 4.

System 300 generally comprises a patient data silo 302, a healthcare professional data silo 304, a support link data silo 306, and a therapy support data silo 308.

Patient data silo 302 can comprise one or more components related to patient data, such as a patient smartphone, a patient wearable, or an enhanced VERIFY system including a digital health app on a hardware device. In embodiments, patient data silo 302 further comprises a medical device.

Healthcare professional data silo 304 can comprise one or more components related to healthcare professional data, such as a digital health clinical portal, or clinic electronic medical record (EMR). Healthcare professional data silo 304 can include one or more devices accessible by the healthcare professional.

Support link data silo 306 can comprise one or more components related to support data, such as a support link customer relationship management (CRM) portal. Support link data silo 306 can include one or more devices accessible by the support link agent.

Therapy support data silo 308 can comprise one or more components related to therapy support data, such as an app executing on a hardware device. Therapy support data silo 308 can include one or more devices accessible by the therapy representative or therapy support specialist.

System 300 further comprises predictor subsystem 310, a digital health subsystem 312, a clinic EMR subsystem 314, a support link CRM subsystem 316, a device tracking subsystem 318, and a data integration hub 320. In embodiments, the various subsystems can include a processor and a data store (e.g. cloud-based processing and database storage).

One skilled in the art will readily appreciate that not all components (subsystems, databases, etc.) depicted in FIG. 3 are required. Further, various components can be combined or implemented in different combinations of system 300. In an embodiment, for example, predictor subsystem can be discrete from other components, as depicted in FIG. 3. In another embodiment, predictor subsystem 310 can be integrated into digital health subsystem 312. In another embodiment, predictor subsystem 310 can be integrated into the nLink app as part of therapy support data silo 308.

Predictor subsystem 310 is configured to receive data from the various data silos 302, 304, 306, 308 and various other subsystems 312, 316, 320 and prepare a prediction related to a medical device. In an embodiment, predictor subsystem 310 can store second instances of data for manipulation without affecting first instances on the various silos. In an embodiment, predictor subsystem 310 can be operably or communicatively coupled to one or more data silos, such as therapy support data silo 308. Accordingly, predictor subsystem 310 can be configured with communication protocols specific to the app (nLink) of therapy support data silo 308.

Digital health subsystem 312 is configured to communicate and process data related to patient data silo 302 and healthcare professional data silo 304. Digital health subsystem 312 is further configured to communicate and process data related to clinic EMR subsystem 314. As depicted, digital health subsystem 312 is operably coupled to patient data silo 302, healthcare professional data silo 304, and predictor subsystem 310. In an embodiment, digital health subsystem 312 is configured to store data for the at-issue patient, as well as data related to other patient (anonymized as needed). Accordingly, comparisons for the at-issue patient can be made against data related to other patients.

Clinic EMR subsystem 314 is configured to communicate and process data related to healthcare professional data silo 304. As depicted, clinic EMR subsystem 314 is operably coupled to healthcare professional data silo 304 and digital health subsystem 312. In an embodiment, clinic EMR subsystem 314 is configured to store healthcare professional data, such as the physician treating the at-issue patient. In embodiments, clinic EMR subsystem 314 is further configured to store data related to other non-treating healthcare professionals (anonymized as needed). Accordingly, comparisons for the treating physician can be made against other physicians.

Support link CRM subsystem 316 is configured to communicate and process data related to support link data silo 306. As depicted, support link CRM subsystem 316 is operably coupled to support link data silo 306 and predictor subsystem 310.

Device tracking subsystem 318 is configured to register and track one or more medical devices. In other embodiments, device tracking subsystem 318 is configured to register and track other hardware devices, such as secondary medical devices or other computing devices.

Data integration hub 320 is configured to communicate and process data related to the registered and tracked devices of device tracking subsystem 318. As depicted, data integration hub 320 is operably coupled to device tracking subsystem 318 and predictor subsystem 310.

In an embodiment, system 300 can be supplemented with historical public health data. For example, one of patient data silo 302, healthcare professional data silo 304, support link data silo 306, or therapy support data silo 308 can be supplemented with or contain historical data for use in therapy prediction. In an embodiment, historical procedure data, historical product data, historical physician data, etc. can be utilized by predictor subsystem 310 to compare and contrast against instant at-issue or current data. Further, data related to social determinants of health can likewise be incorporated.

Figure 4:
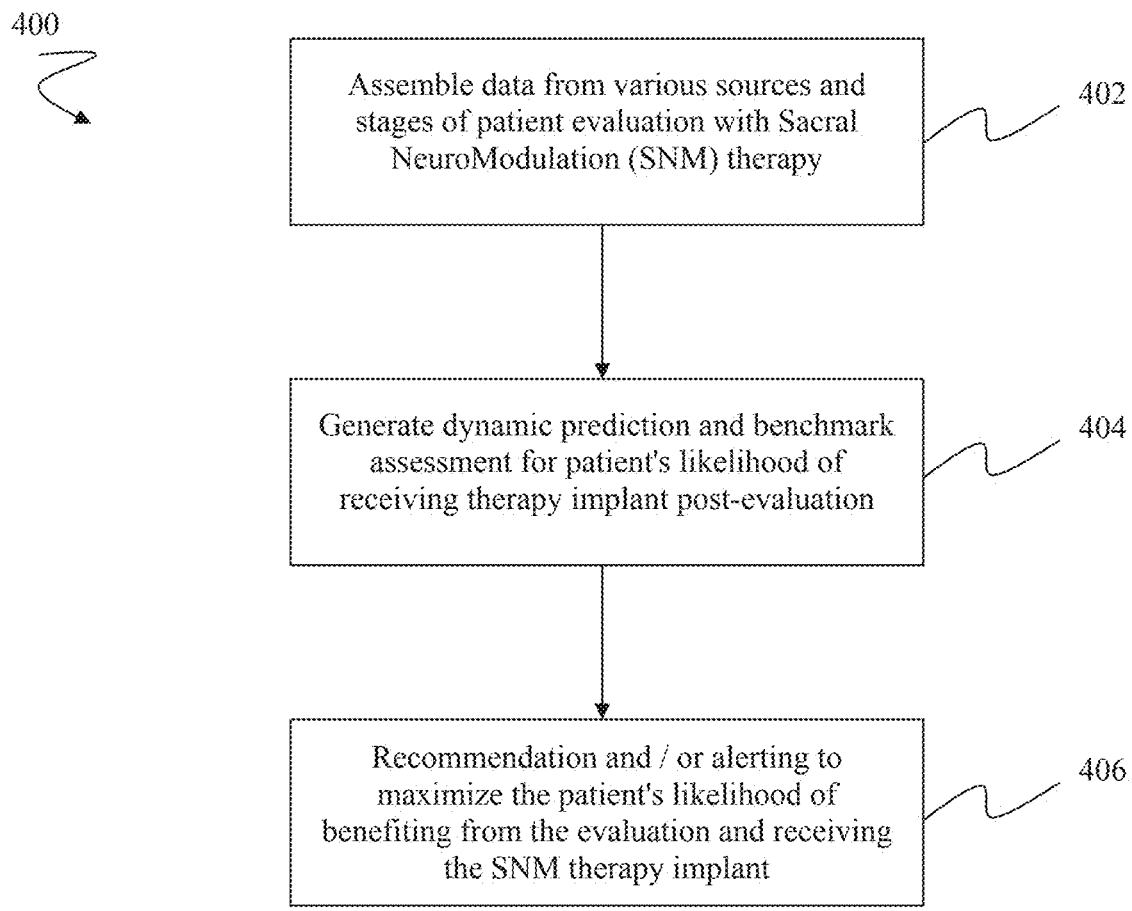
FIG. 4 is a flowchart of a method for dynamic prediction for a medical device, according to an embodiment.

Referring to FIG. 4, a flowchart of a method 400 for dynamic prediction for a medical device is depicted, according to an embodiment. In an embodiment, method 400 can be implemented by, for example, system 100 or system 300. For ease of explanation, reference is made to the components of system 300.

In operation of system 300, at 402, data is assembled from various sources and stages of patient evaluation. In an embodiment, patient evaluation is specific to SNM therapy. Data can originate from one of data silos 302, 304, 306, 308. Further, data can originate from one of subsystems 312, 314, 316, 318, as will be explained in the example that follows. In an embodiment, the data is assembled by predictor subsystem 310.

In an embodiment, data can be assembled from pre-evaluation sources. Pre-evaluation data can include patient demographics, such as age. Age can be derived from the patient's date of birth entered by an authorized rep/therapy support specialist (TSS) in their patient support (nLink) application (308) or automatically pulled from clinic EMR subsystem 314 into digital health subsystem 312 and then into predictor subsystem 310.

In an embodiment, pre-evaluation data can include gender. Gender can be entered by an authorized rep/TSS in the nLink application (308) or automatically pulled from clinic EMR subsystem 314 into digital health subsystem 312 and then into predictor subsystem 310.

In an embodiment, patient demographics can include height. Height can be automatically pulled from clinic EMR subsystem 314 into digital health subsystem 312 and then into predictor subsystem 310.

In an embodiment, patient demographics can include weight. Weight can be automatically pulled from clinic EMR subsystem 314 into digital health subsystem 312 and then into predictor subsystem 310.

In an embodiment, patient demographics can include ethnicity. Ethnicity can be automatically pulled from clinic EMR subsystem 314 into digital health subsystem 312 and then into predictor subsystem 310.

In an embodiment, patient demographics can include social determinants. Social determinants can be automatically pulled from clinic EMR subsystem 314 or from profiles in the patient's smart devices/wearables of patient silo 302 into digital health subsystem 312 and then into predictor subsystem 310.

Pre-evaluation data can further include patient indication, which can entered by an authorized rep/TSS in the nLink application (308) or automatically pulled from clinic EMR subsystem 314 into digital health subsystem 312 and then into predictor subsystem 310.

Pre-evaluation data can further include patient comorbidities, e.g., interstitial cystitis, which can be automatically pulled from clinic EMR subsystem 314 into digital health subsystem 312 and then into predictor subsystem 310.

Pre-evaluation data can further include patient symptoms and time of onset for symptoms, which can be automatically pulled from clinic EMR subsystem 314 into digital health subsystem 312 and then into predictor subsystem 310. Alternatively, patient symptoms and time of onset can be derived from patient data silo 302.

Pre-evaluation data can further include patient history of therapies tried, such as physical therapy, medications, botox, percutaneous tibial neuromodulation. In an embodiment, such data can be automatically pulled from clinic EMR subsystem 314 into digital health subsystem 312 and then into predictor subsystem 310.

Pre-evaluation data can further include a patient's current medications. In an embodiment, such data can be automatically pulled from clinic EMR subsystem 314 into digital health subsystem 312 and then into predictor subsystem 310. Alternatively, current medications can be derived from patient data silo 302.

Pre-evaluation data can further include a patient's activity profile. Such data can be automatically pulled from the patient's smart devices/wearables or sensors present in therapy devices/accessories (e.g., enhanced VERIFY system, Reveal Linq) of patient data silo 302 into digital health subsystem 312 and then into predictor subsystem 310.

Pre-evaluation data can further include a physician's volume of evaluations (e.g., average volume per year). In an embodiment, evaluations are actively aggregated in the nLink application (308), based on the evaluations performed by physicians and entered in the nLink application (308) by an authorized rep/TSS over time, which can then be transferred to predictor subsystem 310.

Pre-evaluation data can further include a physician's past performance on evaluation-to-implant conversions. In an embodiment, evaluation-to-implant conversions are actively aggregated in the nLink application (308), based on the evaluations and implants performed by physicians and entered in the nLink application (308) by an authorized rep/TSS over time, which can then be transferred to predictor subsystem 310. Implant data can also be confirmed from device tracking subsystem 318 via data integration hub 320.

Pre-evaluation data can further include a physician amount of experience with evaluations for SNM. In an embodiment, experience data can be actively aggregated in the nLink application (308), based on the evaluations and implants performed by physicians and entered in the nLink application (308) by an authorized rep/TSS over time, which can then be transferred to predictor subsystem 310. In an embodiment, experience data can be collected or confirmed from device tracking subsystem 318 via data integration hub 320.

Pre-evaluation data can further include quality measures associated with the trialing physician, such as volume of complaints. In an embodiment, quality measures are actively aggregated from internal databases monitoring complaints and quality measures (e.g., the Global Complaint Handling system—not shown) and provided to the predictor subsystem 310 via data integration hub 320.

Pre-evaluation data can further include device manufacturer touch-points with the physician, e.g., for medical education, symposia, and other programs. In an embodiment, touch-point data can be actively collected from internal databases aggregating physician engagement information (e.g., a Customer Data Integration database—not shown) and provided to predictor subsystem 310 via data integration hub 320.

In an embodiment, data can be assembled from the initiation of evaluation. For example, initial evaluation data can include the day of the lead placement procedure (weekday versus weekend). Day data can be derived from data entered by an authorized rep/TSS in the nLink application (308) or from data automatically pulled from clinic EMR subsystem 314 into digital health subsystem 312 and then into predictor subsystem 310.

Initial evaluation data can further include a type of evaluation (e.g. basic versus advanced). Type of evaluation can be entered by an authorized rep/TSS in the nLink application (308) or automatically pulled into predictor subsystem 310 from digital health subsystem 312. In embodiments, a type of evaluation can be based on a remote follow-up feature.

Initial evaluation data can further include a number of lead placement procedures stacked by the physician on the same day as the patient's lead placement, as well as timing of these procedures. In an embodiment, stacking and timing data can be derived from data entered by an authorized rep/TSS in the nLink application (308) or from data automatically pulled from clinic EMR subsystem 314 into digital health subsystem 312 and then into predictor subsystem 310.

Initial evaluation data can further include data on a specific lead implant technique (e.g., Dr. Siegel's technique). Technique data can be entered by an authorized rep/TSS in the nLink application (308), which can then be integrated into predictor subsystem 310.

Initial evaluation data can further include a location of the Evaluation lead—entered by an authorized rep/TSS in the nLink application (308), which can then be integrated into predictor subsystem 310.

Initial evaluation data can further include testing results for amplitude threshold associated with the lead contact/s. Testing result data can be entered by an authorized rep/TSS in the nLink application (308), which can then be integrated into predictor subsystem 310. In another embodiment, testing result data can be automatically pulled into predictor subsystem 310 from the digital health subsystem 312, based on a remote follow-up feature.

Initial evaluation data can further include enhanced VERIFY programmer settings and configuration during the patient's Evaluation. VERIFY and configuration settings can be entered by an authorized rep/TSS in the nLink application (308), which can then be integrated into predictor subsystem 310. In another embodiment, VERIFY and configuration settings can be automatically pulled into predictor subsystem 310 from the digital health subsystem 312, based on a remote follow-up feature.

In an embodiment, data can be further assembled from data sources during ongoing evaluation or completion of evaluation. For example, patient symptom data during each day of the ongoing evaluation can be assembled. In an embodiment, patient symptom data can be reported by the patient in a digital health patient application (patient data silo 302) and provided to predictor subsystem 310 from the digital health subsystem 312. In an embodiment, patient symptom data can be reported by the patient's Health Care Professional (HCP) in healthcare data silo 304 and provided to predictor subsystem 310 via digital health subsystem 312. In an embodiment, patient symptom data can be reported by an authorized device rep/TSS in the nLink application (308), and subsequently provided to predictor subsystem 310. In an embodiment, patient symptom data can be reported by an authorized support link program agent using support link data silo 306, and subsequently provided to predictor subsystem 310.

In another example of data sources during ongoing evaluation or completion of evaluation, a patient's perception of symptom relief for each day of the ongoing evaluation can be utilized. In an embodiment, perception of symptom relief data can be reported by the patient in the digital health patient application of patient data silo 302, and provided to predictor subsystem 310 via digital health subsystem 312. In an embodiment, perception of symptom relief data can be reported by the patient's Health Care Professional (HCP) in healthcare data silo 304 and provided to predictor subsystem 310 via digital health subsystem 312. In an embodiment, perception of symptom relief data can be reported by an authorized device rep/TSS in the nLink application (308), and subsequently provided to predictor subsystem 310. In an embodiment, perception of symptom relief data can be reported by an authorized support link program agent in the support link CRM system in support link data silo 306, and provided to predictor subsystem 310. In an embodiment, perception of symptom relief data can be derived from mood or sentiment sources, such as voice-enabled smart devices (e.g. ALEXA) or in social media (e.g. FACEBOOK, TWITTER, etc.)

In another example of data sources during ongoing evaluation or completion of evaluation, a patient's enhanced VERIFY programming status can be utilized, such as an "on/off" status, a duration of "on" time with a previous program, the programs used, and/or electrode impedances can be provided to predictor subsystem 310 via digital health subsystem 312.

In another example of data sources during ongoing evaluation or completion of evaluation, a patient's activity status can be derived from the patient's smart devices, wearables (e.g smart clothing), or sensors present in therapy devices or accessories. In an embodiment, patient activity status can be provided to predictor subsystem 310 via digital health subsystem 312. For example, sounds collected from a patient's phone (e.g., handwashing, toilet flushing) or other wearable or patient-based sensor (e.g. acoustic, bladder pressure, ultrasound, imaging, etc.) can be utilized to trigger symptom or event data collection. In embodiments, an incontinence event can be determined without patient interaction by such sensors.

In another example of data sources during ongoing evaluation or completion of evaluation, a patient's engagement with a support link program can be pulled from the Support Link program data feeding from the Support Link CRM into predictor subsystem 310.

In another example of data sources during ongoing evaluation or completion of evaluation, a patient's engagement with a device ambassador program or other patient experience programs can be utilized. In an embodiment, such data can be documented in the nLink application (308) by authorized customer and patient services team members.

In another example of data sources during ongoing evaluation or completion of evaluation, sales rep-related support data can be utilized. For example, "the rep left the device company in less than 1 month after the evaluation started." Such data can be derived by predictor subsystem 310, from the process of managing nLink user access in therapy support data silo 308.

At 404, a dynamic prediction and benchmark assessment is generated. In an embodiment, the dynamic prediction is a patient's likelihood of receiving a therapy implant post-evaluation. More particularly, data sources feed into one or more algorithms in predictor subsystem 310 that predicts the patient's likelihood of receiving the SNM therapy implant. In an embodiment, the dynamic prediction and benchmark assessment is made by predictor subsystem 310.

A prediction algorithm can include myriad attributes. In an embodiment, data sources or variables can be weighted to exercise higher influence on the predictor algorithm. For example, age, gender, physician's volume of evaluations, physician's past performance on evaluation-to-implant conversions, physician's experience with SNM evaluations, type of evaluations, number of lead placement procedures by the physician within a period of time, patient's perception of symptom relief, and patient's engagement with support programs can be given more weight than other variables.

Referring to FIG. 5, a table of data sources and corresponding prediction variables for a particular prediction algorithm for a medical device is depicted, according to an embodiment. More particularly, the table of FIG. 5 highlights the specific weighting for each data source, in terms of parameter estimates and unit odds ratios to feed into the algorithm that predicts the patient's likelihood for receiving an SNM therapy implant. In an embodiment, a standard error exists in the 95% confidence interval, along with the statistical significance in how much weight is given to the overall outcome of prediction. As depicted, the "Estimate" column indicates the relationship of a particular data source to the likelihood a patient will receive an SNM therapy implant.

Embodiments therefore realize dynamic (e.g. day-to-day, week-to-week) prediction for an individual patient, based on real-time feed of data. Prediction is dynamic in that it can be updated based on more data, or more specific data that is captured over time. For example, initially (say, time 0), the algorithm makes one general recommendation with a broader range, based on population-level data. Over time (say, 6 months), as more patient-specific data feed into system 300, algorithms can provide a better, more specific (narrower range) prediction.

In embodiments, data for each individual patient can be assembled by aggregation engine 112 into a patient profile. A patient profile therefore can contain a set of patient characteristics-data associated with that patient. In embodiments, patient profiles can further be categorized into or further define a predefined patient profile type. For example, patients with characteristics matching [A, B, C] are grouped into Type I; patients with characteristics matching [X, Y, Z] are grouped into Type II.

Patient characteristics can be derived from pre-evaluation data sources, data sources from the initiation of evaluation, data sources during an ongoing evaluation, and/or data sources after completion of the evaluation. In embodiments, patient profiles can be stored in an array or other data structure that enables efficient pairwise comparisons across patient characteristics. For example, individual patient characteristics can be compared (e.g. characteristic to characteristic), or a plurality of characteristics can be compared (e,g. profile to profile). In one embodiment, patient profiles can be filtered such that only similar type patients are compared, thereby increasing the efficiency of determining similar patients.

In embodiments, data stored within data sources can include patient symptom data recorded by the patient, a support link agent, an authorized representative, and a therapy support specialist. Patient symptom data can include the patient's perception of symptom relief.

In embodiments, a patient's digital health application, a support link program's customer relation management (CRM) system, and an nLink application (patient support application) can provide patient characteristics in real-time that further define the patient's patient profile.

In embodiments, examples of dynamic recommendations based on real-time updates are further disclosed with respect to FIG. 6, as will be discussed.

In an embodiment, dynamic prediction for an individual patient can be therefore based on data associated with that patient (e.g., demographic, such as weight). In other embodiments, dynamic prediction for an individual patient can be based on secondary considerations such as comparison to other patients with a similar patient profile (aka, patients like the instant patient).

In embodiments, diversity of data sources and real-time updates facilitate accurate comparisons with similar patient profiles of other patients. In embodiments, prediction engine 114 can analyze the development of patient symptom data in similar patient profiles to refine which similar patient profiles are selected for comparisons. Further, prediction engine 114 can analyze trends in patient symptom data across a plurality of patient profiles to better classify the relevance of different patient characteristics.

In embodiments, data for each physician can be assembled by aggregation engine 112 into a physician profile. A physician profile therefore can contain a set of physician characteristics—data associated with that physician, such as the number of evaluation lead placement procedures stacked for their patients in the same day. In embodiments, physician profiles can further be categorized into or further define a predefined physician profile type. For example, physicians with characteristics matching [A, B, C] are grouped into Type I; physicians with characteristics matching [X, Y, Z] are grouped into Type II.

Physician characteristics can be derived from the environment of the physician, such as their practice level and location, as well as their evaluation history and schedule, including years of experience in offering evaluations and average annual volume of evaluations. In embodiments, physician profiles can be stored in an array or other data structure that enables efficient pairwise comparisons across physician characteristics. For example, individual physician characteristics can be compared (e.g. characteristic to characteristic), or a plurality of characteristics can be compared (e,g. profile to profile). In one embodiment, physician profiles can be filtered such that only similar type physicians are compared, thereby increasing the efficiency of determining similar physicians.

In an embodiment, dynamic prediction or benchmark assessment for an individual physician's likelihood of their patients receiving therapy implant post-evaluation can be based on data associated with that physician (e.g., average annual volume of evaluations; number of evaluation lead placement procedures stacked for their patients in the same day). In other embodiments, dynamic prediction or benchmark assessment for an individual physician's likelihood of their patients receiving therapy implant post-evaluation can be based on comparison to a matched cohort of physicians (aka, physicians like the instant physician) at a practice level (e.g., physicians in the same practice) or national level based on aggregated data, such as years of experience in offering evaluations, average annual volume of evaluations, patient selection, lead positions, impedance thresholds achieved for lead contact/s, and indications and/or baseline symptoms of patients served. Such comparisons can be made against a profile generated for the physician, and compared to physicians or an aggregate of physicians with a similar profile, such as physicians with the same profile type.

At 406, a recommendation and/or alert is made. In an embodiment, the recommendation and/or alert is made to maximize a patient's likelihood of benefiting from the evaluation and receiving an SNM implant. In an embodiment, the recommendation is made by predictor subsystem 310, to be distributed where appropriate to one or more data silos 302, 304, 306, 308, as indicated by predictor subsystem 310.

Example outputs are provided herein for the recommendation and/or alerting engine to maximize the patient's likelihood for benefiting from the evaluation and receiving the SNM therapy implant. The recommendation examples provided herein are in no way limiting, as these embodiments are given only by way of example.

In an embodiment, recommendations can be made based on predetermined or structured algorithms, as disclosed herein.

For example, an alert can be made to the authorized rep in the nLink application (308), warning the rep on the potentially low likelihood for patients receiving therapy implants when too many evaluation lead placement procedures are scheduled on the same day by the same physician. The likelihood for the patient to receive the therapy implant is dynamically computed, based on the high number of evaluation lead placement procedures being scheduled on the same day by the same physician in the clinic's schedule, or as recorded by the authorized rep or TSS in the corresponding nLink application (308).

In another example, a recommendation for the rep in the nLink application (308) can suggest an advanced evaluation versus a basic evaluation, enable support link services via support link silo 306 or connect the patient with a patient ambassador. For example, an advanced evaluation may be more appropriate for older patients.

In another example, a recommendation in the patient's digital health application via patient data silo 302 can suggest connecting with physicians that offer advanced evaluations. In an embodiment, such a recommendation can apply where a patient that is an appropriate candidate to receive an advanced evaluation is currently managed by a physician that only offers basic evaluations.

In another example, an alert can be made to the authorized rep in the nLink application (308), or to the authorized support link agent in the support link CRM via support link data silo 306, or to the patient's HCP in clinic EMR subsystem 314 to recommend therapy adjustments (e.g., therapy program or amplitude or side changes, as appropriate) or next steps in the care pathway for a patient with less than 50% improvement in his/her symptoms during evaluation.

In another example, a recommendation can be made to a patient (e.g., in the enhanced VERIFY programming application, or the digital health application) via patient data silo 302 to adjust his/her therapy side, program, or amplitude (dial up, dial down, revert to prior setting), when the patient experiences less than 50% improvement in his/her symptoms during evaluation.

In embodiments, dynamic improvement of therapy can be achieved through comparisons between patients and physicians. Individual patient and physician characteristics can be compared (e.g. characteristic to characteristic), or a plurality of characteristics can be compared (e,g. profile to profile). Dynamic improvements of therapy can include recommendations that help improve or optimize the stimulation therapy or technology for the patient as well as recommendations that help improve communications between the parties involved. Importantly, these dynamic improvements can occur before, during, or after an evaluation, including after implant.

In an example, an alert can be made to the authorized rep in the nLink application (308) and the authorized support link agent in the support link CRM via support link data silo 306 to recommend therapy adjustments (e.g., therapy program or amplitude or side changes, as appropriate) for the patient. In another embodiment, an alert can be auto-scheduling an appointment for the patient to connect with an ambassador that has similar characteristics as the patient, when the patient perceives slight improvement in his/her symptoms during the evaluation.

In another example, an alert can be made to the patient, on his/her smartphone, digital health application, or the enhanced VERIFY programming application via patient data silo 302 regarding potential to dislodge a therapy stimulation lead, when high physical activity is determined from their smart devices, wearables or sensors present in therapy devices, or accessories.

In another example, a recommendation can be made to the patient in the enhanced VERIFY programming application via patient data silo 302 to adjust his/her therapy side, program, or amplitude in case a sensory and/or motor response is not recorded during a routine check of the therapy amplitude threshold.

In another example, a recommendation can be made to the patient, in their enhanced VERIFY programming application via patient data silo 302, to wait and, in parallel, notify their caregiver (in the caregiver's smartphone or email), authorized rep/TSS (in the nLink application) via therapy support data silo 308, authorized support link agent (in the Support Link CRM) via support link data silo 306, or the health clinical portal (in the clinic EMR or the digital health clinician portal) via healthcare data silo 304, when the patient has made a high number of therapy adjustments during evaluation.

In an embodiment, alerts that help improve or optimize the stimulation therapy or technology for the patient can likewise be made. For example, an alert to multiple stakeholders can be made to check whether it was intentional that the patient's therapy device was detected as turned off over a pre-defined duration of time. The alert can be issued to, for example, the authorized rep/TSS in the nLink application (308), an authorized support link agent in the support link CRM via support link data silo 306, the patient's health clinical portal in the clinic EMR healthcare data silo 304, and the patient through his/her smartphone via patient data silo 302. The alert can also include a link to an educational video that can help the patient identify the issue and turn the therapy stimulation back on.

In another embodiment of an alert to help improve or optimize the stimulation therapy or technology can be made to optimize therapy battery charge consumption by customizing the "stimulation on" time for the patient. For example, an alert can be transmitted only when the patient's symptoms dominantly show up at a certain state (e.g., when the patient is awake). When determining whether these customizations are appropriate for the patient, the patient's patient characteristics or patient profile can be compared to those of other patients who have made a similar customization in their own stimulation therapy. In another embodiment, an alert can be transmitted after a particular duration of time has passed since the patient's last symptom was manually or automatically recorded, and the patient is known to experience another symptom soon, based on prior artificial intelligence-based learning of the patient's symptom profile. In an embodiment, an alert can be made to prompt the patient to reach out to another stakeholder, such as the authorized rep or the physician (for example, when battery life reaches a certain threshold).

In another embodiment, therapy stimulation parameters can be optimized with respect to battery charge. For example, stimulation can be turned on or switched to a different program based on suboptimal electrode impedances in view of the current or predicted future battery charge and to programming parameters previously identified by the clinician as suitable alternatives for the patient. In this embodiment, an alert can be sent to the patient, on his/her smartphone, digital health application, or the enhanced VERIFY programming application via data silo 302, to the authorized rep/TSS in the nLink application (308), to the patient's health clinical portal in the clinic EMR healthcare data silo 304, and to relevant support representatives via support link data silo 306, notifying each user of the optimization executed for the patient's therapy stimulation parameters, and surveying the users on satisfaction associated with this service.

In another example, a recommendation can be made to the patient, on his/her smartphone, digital health application, or the enhanced VERIFY programming application via patient data silo 302 regarding preferred timings of food and/or fluid intake, exercise, certain activities, or bathroom visits.

In another example, the aforementioned patient-based sensors can automatically sense therapy issues (e.g. impedance, programmer off), or for example, the return of certain patient symptoms, and trigger an alert to the patient to troubleshoot common, relevant therapy, and/or lifestyle issues. If the sensed therapy issues go unresolved, other stakeholders can be alerted to proactively intervene. When alerting physicians of unresolved issues, recommendations can be made based on optimizations to the stimulation therapy or technology that have been implemented by other physicians to resolve the issues. In making these recommendations, physician characteristics and patient characteristics can be considered to tailor the solution to the individual patient's situation.

In another example, an alert can be sent to the authorized rep/TSS in the nLink application (308), and the patient's health clinical portal in the clinic EMR via healthcare data silo 304, recommending offering an advanced evaluation to the patient who had a failed basic evaluation.

In another example, an alert can be sent to the relevant district manager, on his/her smartphone, to ensure that support is provided to all patients, who are undergoing evaluation or have recently completed evaluation and are in a territory, wherein the authorized territory rep has recently left the device manufacturer.

In another example, an alert can be sent to the authorized support link agent in the support link CRM via support link data silo 306, regarding auto-enrollment of patients in "hypercare", for patients that are undergoing evaluation or have recently completed evaluation and are in a particular territory, wherein the authorized territory rep has recently left the device manufacturer.

In another example, a recommendation can be sent to physicians in the digital health clinician portal via healthcare data silo 304 to view specific educational content or connect with contacts that can facilitate training on aspects of evaluation (e.g., lead placement procedure) and help the physician improve the likelihood of patients receiving therapy implants post-evaluation. Physician characteristics that are deemed most relevant in determining the likelihood of receiving therapy implants post-evaluation can be weighted more heavily, so physicians lacking in these important areas are more likely to receive a recommendation.

In another example, an alert can be sent to the authorized rep/TSS in the nLink application (308), and to a physician in the digital health clinician portal via healthcare data silo 304, indicating that the physician has reached a high average annual volume of evaluations and can stack more procedures on the same day. The alert can be complemented with a pre-identified set of patients that are eligible to have the implant or replacement procedure performed in the near-term.

In another embodiment, recommendations can be made using machine learning of patient data and/or conditions highlighted herein. Auto-adjustments to the machine learning can be made to optimize therapy settings and maximize the patient's likelihood for benefiting from the evaluation and receiving the SNM therapy implant.

In another example, time data from past symptoms or other attributes can automatically be computed to assess the next symptom. In embodiments, a prediction for next fecal episode can be made based on patient demographics, other indications, recent pregnancy, food intake, posture, or activity, etc.

In an embodiment, patient activity and symptom data can trigger synchronous auto-checks on therapy (on/off, impedance, past "on" time, past programming data, etc.). Subsequently, patient activity and symptom data-triggered synchronous auto-adjustments can be made therapy after checking and receiving approval (e.g. from clinician and/or patient). Once checks are executed, and/or auto-adjustments in therapy are made, automated notifications can be made to patient therapy app, clinician EMR protocol, relevant sales rep and documentation system. A notification can, in turn, auto-generate the services agent reaching out to the patient for experience-related survey or any follow-up, if needed.

Figure 6:
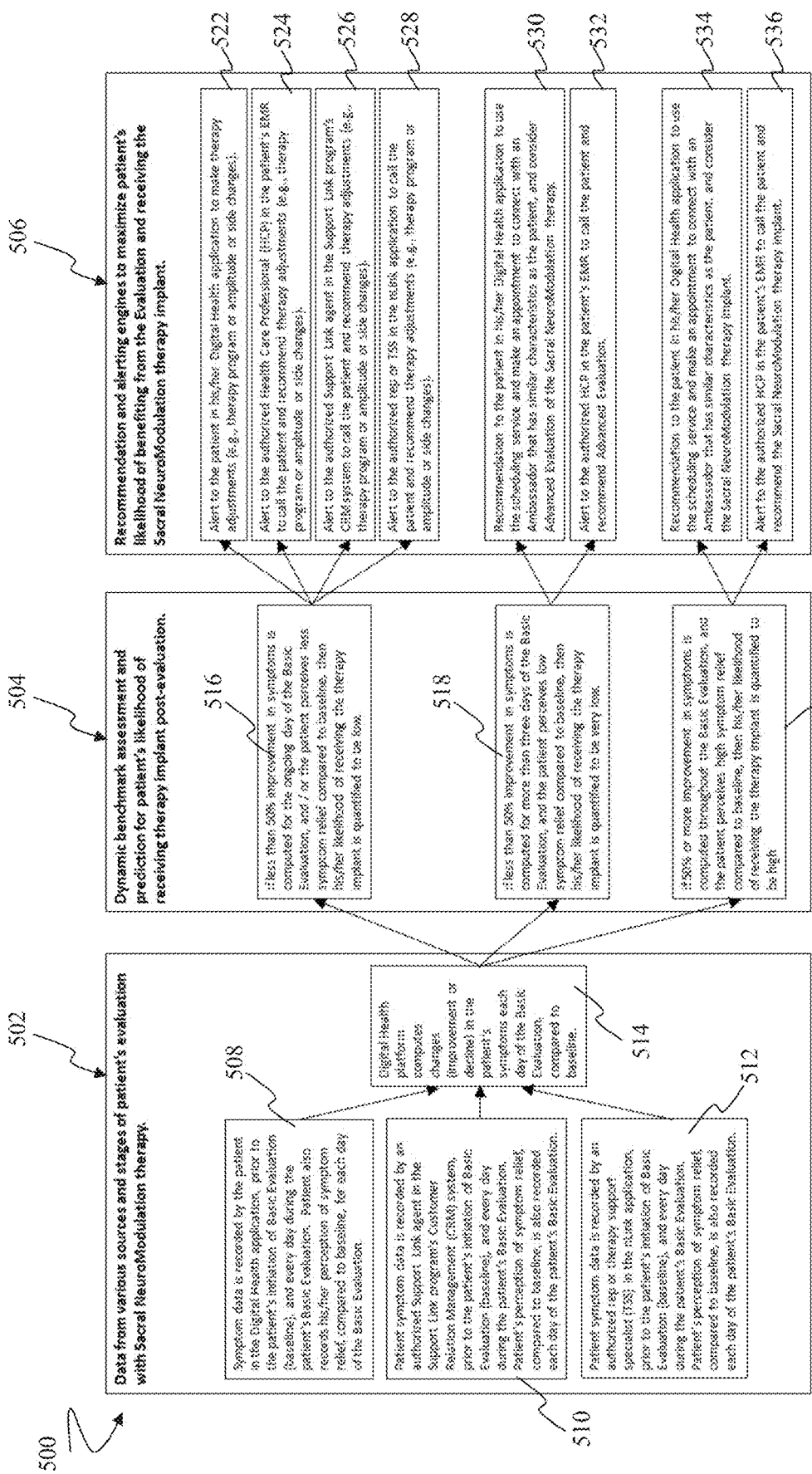
FIG. 6 is a further detailed flowchart of the method for dynamic prediction for a medical device of FIG. 4, according to an embodiment.

Referring to FIG. 6, a further detailed flowchart of a method 500 for dynamic prediction for a medical device for the method of FIG. 4 is depicted, according to an embodiment. More particularly, method 500 depicts examples of dynamic recommendations based on real-time updates in patient's data, and specifically, based on real-time assessments and prediction for the patient's likelihood of receiving a therapy implant, computed using patient's symptom and perception data inputs.

Method 500 generally comprises assembling data from various sources and stages of a patient's evaluation with an SNM therapy at 502, generating a dynamic benchmark assessment and prediction for a patient's likelihood of receiving a therapy implant post-evaluation at 504, and recommending and alerting to maximize a patient's likelihood of benefitting from the evaluation and receiving the therapy implant at 506.

At 502, the method further comprises, at 508, recording symptom data by the patient in the digital health application prior to initiation of a basic evaluation to create a baseline, and every day during the basic evaluation. In an embodiment, the patient's perception of symptom relief is also recorded by the patient relative to a baseline for every day of the basic evaluation. In embodiments, symptom data can be recorded at intervals greater or less than one day.

At 502, the method further comprises, at 508, recording patient symptom data by an authorized agent in the support link CRM prior to initiation of the basic evaluation to create a baseline, and every day during the basic evaluation. In an embodiment, the patient's perception of symptom relief is also recorded by the authorized agent relative to a baseline for every day of the basic evaluation. In embodiments, symptom data can be recorded at intervals greater or less than one day.

At 502, the method further comprises, at 510, recording patient symptom data by a therapy support specialist in the nLink application prior to initiation of the basic evaluation to create a baseline, and every day during the basic evaluation. In an embodiment, the patient's perception of symptom relief is also recorded by the therapy support specialist relative to a baseline for every day of the basic evaluation. In embodiments, symptom data can be recorded at intervals greater or less than one day.

In an embodiment, data recorded at 508, 510, and 512 feed into computation of a delta compared to the baseline at 514. The delta calculation can be improvement or decline in symptoms based on the data entered or recorded in 508, 510, and 512.

At 504, the method further comprises evaluating improvement or decline. In particular, at 516, if less than 50% improvement in symptoms is computed for the ongoing day of the basic evaluation and/or the patient perceives less symptom relief compared to the baseline, then the patient's likelihood of receiving a therapy implant is low.

At 518, if less than 50% improvement is computed for more than three days of the basic evaluation, and the patent perceives low symptom relief compared to the baseline, then the patient's likelihood of receiving a therapy implant is very low.

At 520, if 50% or greater improvement in symptoms is computed throughout the basic evaluation, and the patient perceives high symptom relief compared to the baseline, then the patient's likelihood of receiving a therapy implant is high.

At 506, from 516, the method further comprises one or more recommendation or alerting options. For example, at 522, an alert to the patient via the digital health application can be made to suggest or implement one or more therapy adjustments. In an embodiment, the therapy adjustment can be a therapy program change, amplitude change, or side changes.

In another example, at 524, an alert to an authorized healthcare professional via the patient's EMR can be made to contact the patient and recommend one or more therapy adjustments. In an embodiment, the therapy adjustment can be a therapy program change, amplitude change, or side changes.

In another example, at 526, an alert to an authorized support link agent in via the support link CRM can be made to contact the patient and recommend one or more therapy adjustments. In an embodiment, the therapy adjustment can be a therapy program change, amplitude change, or side changes. In an embodiment, the therapy adjustment can be determined based on successful therapy adjustments made to similar patient profiles.

In another example, at 528, an alert to an authorized rep or TSS in the nLink application can be made to contact the patient and recommend one or more therapy adjustments. In an embodiment, the therapy adjustment can be a therapy program change, amplitude change, or side changes.

At 506, from 518, and further at 530, a recommendation can be made to the patient via the digital health application to use a scheduling service to make an appointment to connect with an ambassador having similar patient characteristics as the patient. In an embodiment, the patient is recommended to consider an advanced evaluation of the SNM therapy.

In another example, at 532, an alert is made to an authorized healthcare provider via the patient's EMR to contact the patient and recommend an advanced evaluation.

At 506, from 520, and further at 534, a recommendation can be made to the patient via the digital health application to use a scheduling service to make an appointment to connect with an ambassador having similar characteristics as the patient. In an embodiment, the patient is recommended to consider having the SNM therapy implant.

In another example, at 536, an alert is made to an authorized healthcare provider via the patient's EMR to contact the patient and recommend the SNM therapy implant.

In other embodiments, as discussed below with respect to FIGS. 7-17, additional data can be incorporated into an SNM therapy prediction (e.g. trial-to-implant or therapy adjustment).

Referring to FIG. 7, a block diagram of input sources shown as players throughout an evaluation-to-implant process is depicted, according to an embodiment. In an embodiment, factors (e.g. input sources) on a patient's evaluation-to-implant conversion can include the patient, the procedure, the physician, the clinic account, the device services, and the representative or technical safety services provided. In an embodiment, hundreds of variables can influence a patient's healthcare journey from evaluation to implant, creating millions of data points when aggregating evaluations from patients over time.

Referring to FIG. 8, a table depicting example regression calculations is depicted, according to an embodiment. For example, as depicted, a brief explanation of linear versus logistic regression is provided. Linear regression can include a continuous outcome variable and can apply to a physician's volume of evaluations. Logistic regression can include a categorical outcome variable and can apply to examples such as whether a patient received an implant or not.

Referring to FIG. 9A, a graph of percent of total evaluations against patient age group is depicted, according to an embodiment. Referring to FIG. 9B, a graph of conversion rates against patient age group is depicted, according to an embodiment. In this example, for every five-year increase in a patient's age, the conversion rate dropped by 1.3% and the odds the patient will receive an implant are reduced by 4%.

Figure 10A:
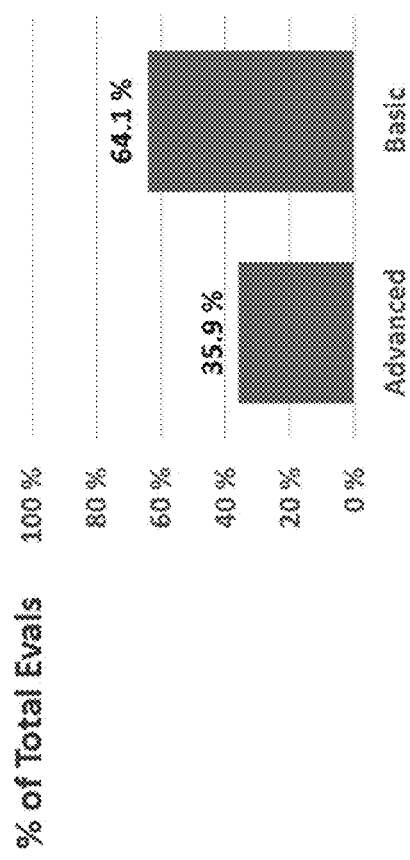
FIG. 10A is a graph of percent of total evaluations against advanced evaluations and basic evaluations, according to an embodiment.
Figure 10B:
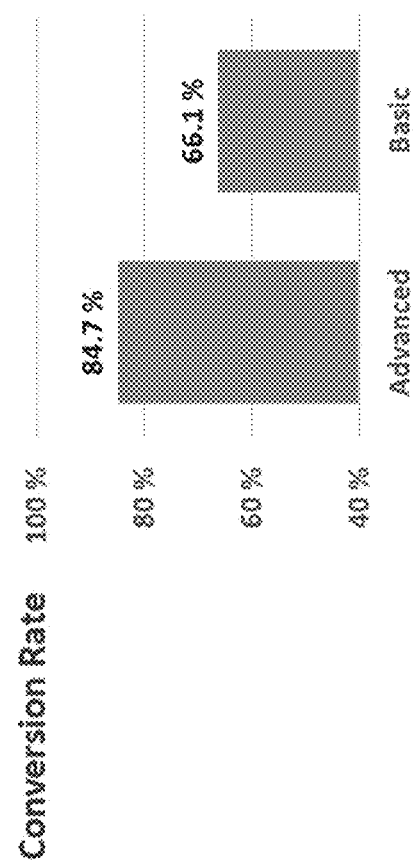
FIG. 10B is a graph of conversion rates against advanced evaluations and basic evaluations, according to an embodiment.

Referring to FIG. 10A, a graph of percent of total evaluations against advanced evaluations and basic evaluations is depicted, according to an embodiment. In this example, 35.9% of total evaluations were advanced while 64.1% were basic. Referring to FIG. 10B, a graph of conversion rates against advanced evaluations and basic evaluations is depicted, according to an embodiment. Advanced evaluations had an 18.6% higher conversion rate than basic evaluations and the odds a patient would receive an implant increase by 187% when the patient undergoes an advanced evaluation over a basic evaluation.

Figure 11A:
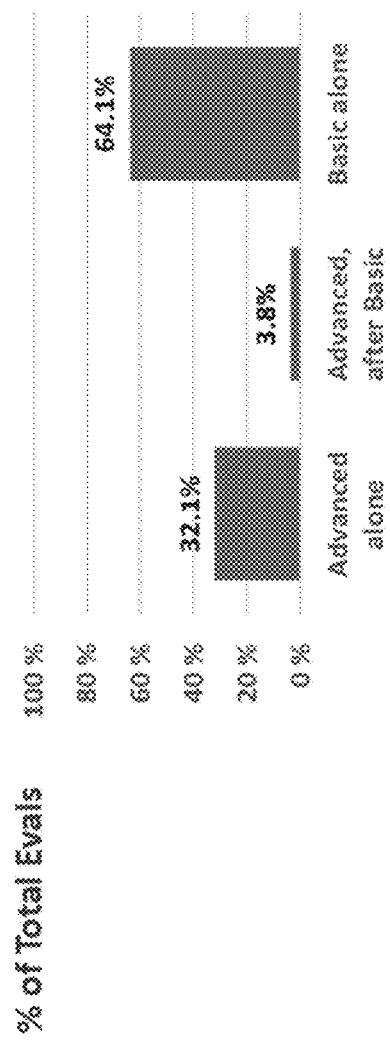
FIG. 11A is a graph of percent of total evaluations against evaluations that are advanced alone, transition to advanced from basic, or basic alone, according to an embodiment.

Referring to FIG. 11A, a graph of percent of total evaluations against evaluations that are advanced alone, transition to advanced from basic, or basic alone is depicted, according to an embodiment. In this example, 3.8% of total evaluations transferred to an advanced evaluation from a failed basic evaluation. Conversion was salvaged in patients that transitioned to an advanced evaluation after a failed basic evaluation.

Figure 11B:
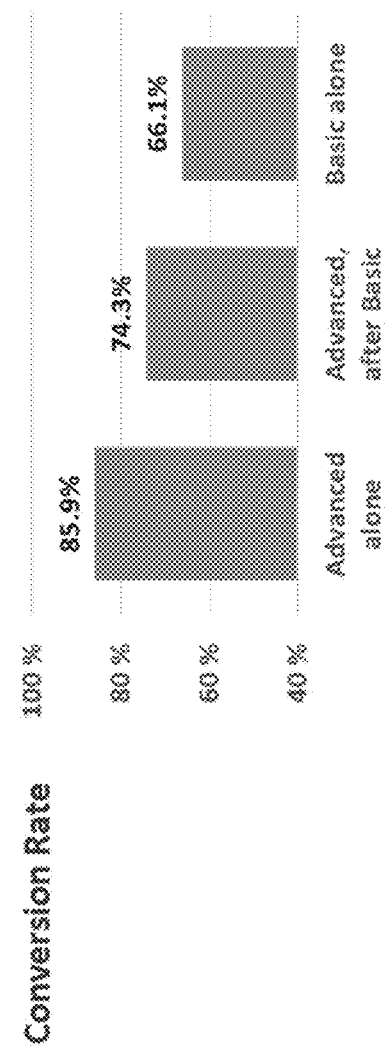
FIG. 11B is a graph of conversion rates against evaluations that are advanced alone, transition to advanced from basic, or basic alone, according to an embodiment.

Referring to FIG. 11B, a graph of conversion rates against evaluations that are advanced alone, transition to advanced from basic, or basic alone is depicted, according to an embodiment.

Figure 12:
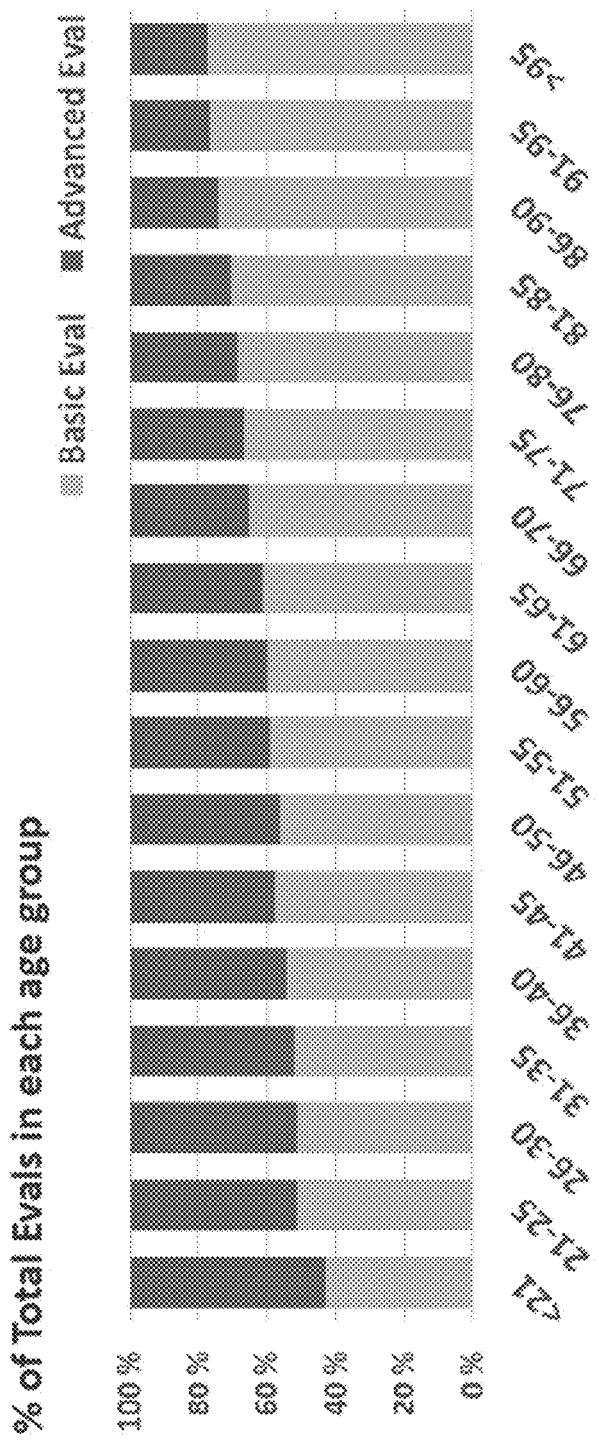
FIG. 12 is a graph of percentage of total evaluations in each age group against basic evaluations or advanced evaluations, according to an embodiment.

Referring to FIG. 12, a graph of percentage of total evaluations in each age group against basic evaluations or advanced evaluations is depicted, according to an embodiment. In this example, a higher proportion of basic evaluations are offered to older patients.

Figure 13:
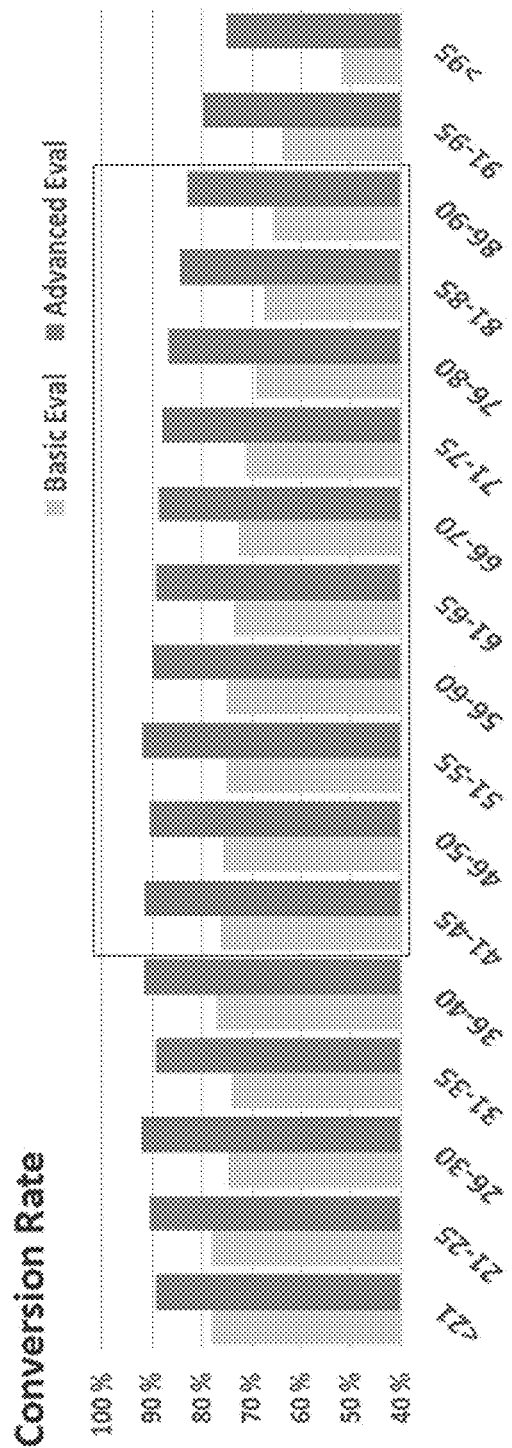
FIG. 13 is a graph of conversion rates in each age group by evaluation type, according to an embodiment.

Referring to FIG. 13, a graph of conversion rates in each age group by evaluation type is depicted, according to an embodiment. In this example, the conversion rate reduces with patient age, for both basic evaluations and advanced evaluations.

Figure 14A:
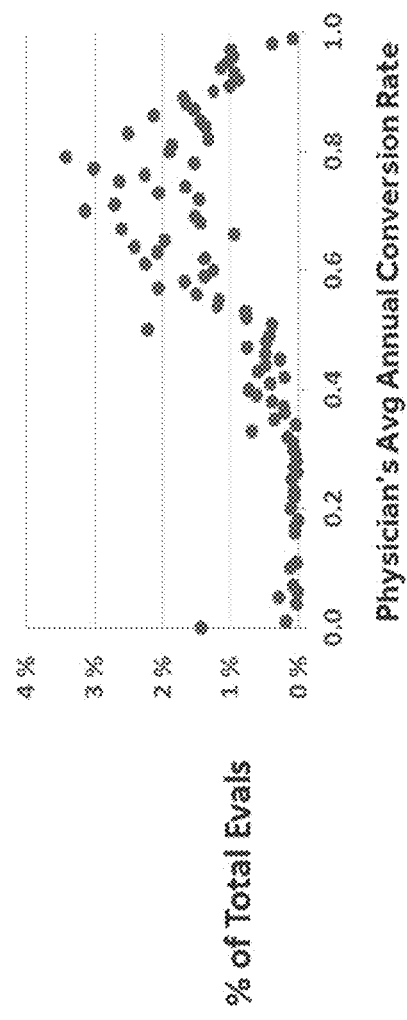
FIG. 14A is a graph of percent of total evaluations against the conducting physician's average annual conversion rate, according to an embodiment.
Figure 14B:
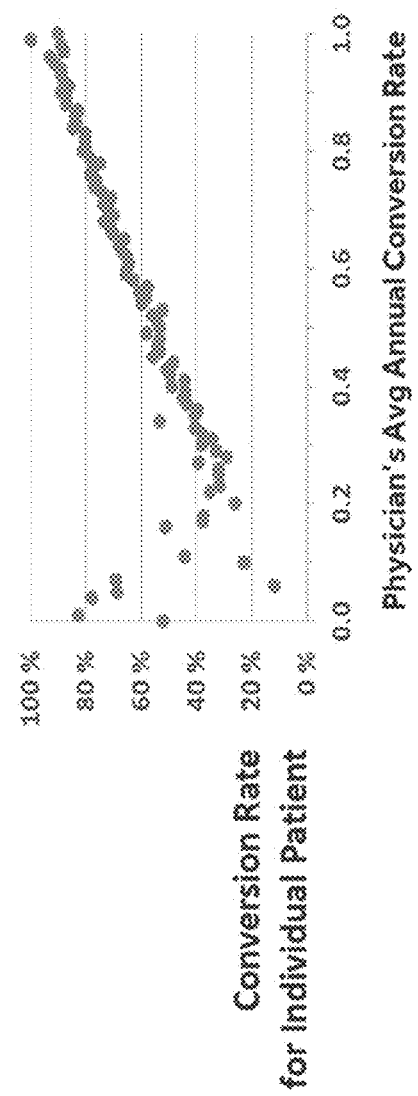
FIG. 14B is a graph of individual patient conversion rates against the conducting physician's average annual conversion rate, according to an embodiment.

Referring to FIG. 146A, a graph of percent of total evaluations against the conducting physician's average annual conversion rate is depicted, according to an embodiment. Referring to FIG. 14B, a graph of individual patient conversion rates against the conducting physician's average annual conversion rate is depicted, according to an embodiment. In these examples, predicted profiles for evaluation to implant conversion are shown for a variety of metrics, including patient age, evaluation type, patient gender, support, max GRA satisfaction value, physician 3 year average annual number of evaluations, physician 3 year average annual number of implants per evaluations, physician years of implanting experience, and number of stacked evaluations on the lead implant day.

Figure 15:
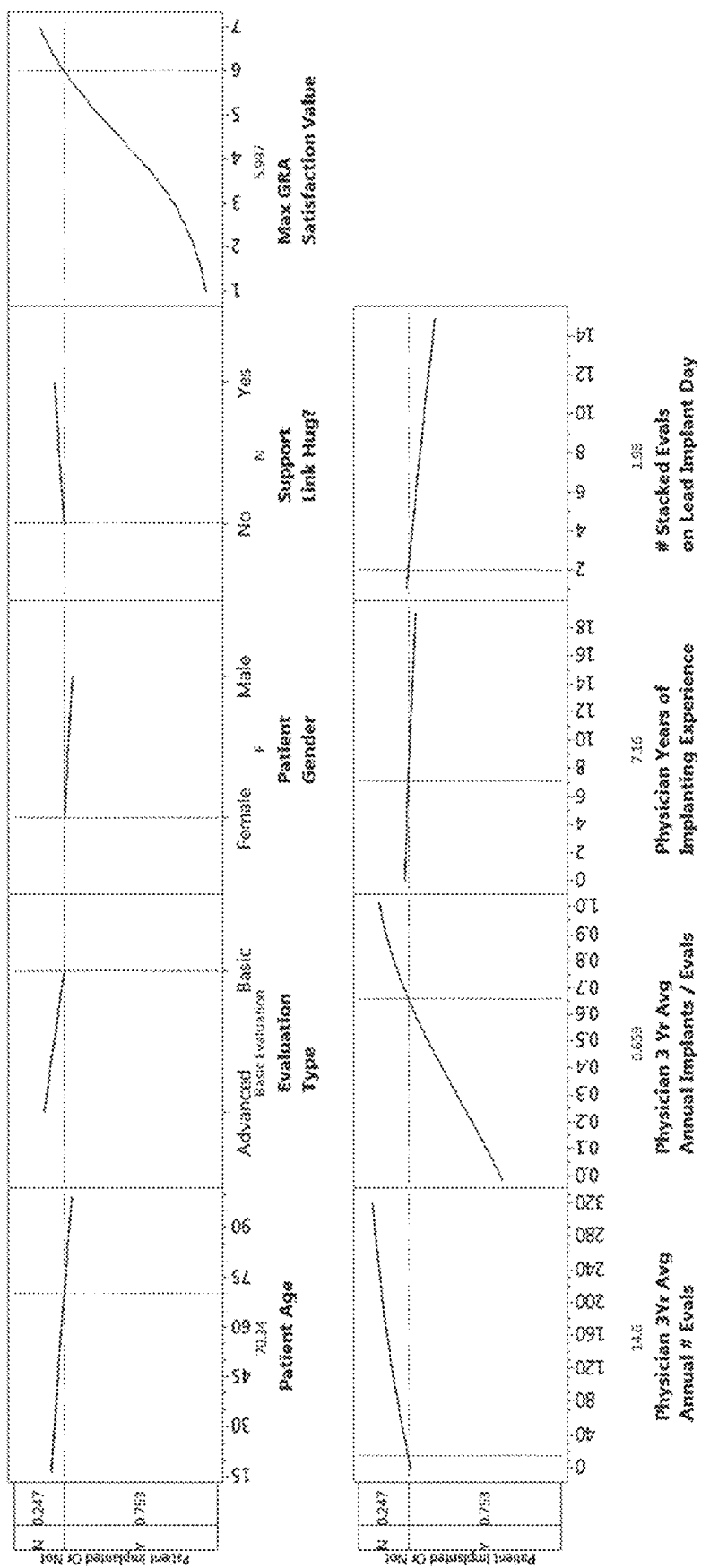
FIG. 15 is a series of graphs depicting predicted evaluation-to-implant conversion profiles against various influencing factors, according to an embodiment.

Referring to FIG. 15, a series of graphs depicting predicted evaluation-to-implant conversion profiles against various influencing factors is depicted, according to an embodiment. In these examples, predicted profiles for evaluation to implant conversion are shown for a variety of metrics, including patient age, evaluation type, patient gender, support, max GRA satisfaction value, physician 3 year average annual number of evaluations, physician 3 year average annual number of implants per evaluations, physician years of implanting experience, and number of stacked evaluations on the lead implant day.

The aforementioned systems and methods can be utilized not only for trial-to-implant or therapy adjustment for SNM therapy prediction, but other implantables as well, such as those for pain relief.

Referring to FIG. 16, a table of model parameters and corresponding prediction variables for a particular prediction algorithm for a medical device related to pain management is depicted, according to an embodiment. These parameters can include both patient characteristics and physician characteristics as well as other influencing factors.

In other embodiments, other or additional variables can be utilized. For example, patient characteristics such as whether the patient has a documented referral, whether the patient has a complaint within a certain number of days within the trial start (e.g. the first 40 days), and/or the patient's age can be utilized.

In embodiments, parameters based on the type of procedure can be utilized, such as the type of trial or type of surgery.

In embodiments, physician characteristics such as the trialing physician's volume (e.g. 3 year average annual number) of trials, implants, or replacements, the physician's past performance on trial success (e.g. 3 year count of successful trials/total trials), the specialty of the trialing physician, and/or whether the trialing physician uses other devices or not can be utilized.

In embodiments, parameters based on the customer account, such as the site of the trialing lead placement can be utilized.

In embodiments, parameters based on the device manufacturer or services provided by the manufacturer can be utilized. For example, a patient's participation in an ambassador program with the service provider, whether a field team supported a surgical consult with the patient prior to trial, whether a field team has followed up with the patient and documented notes in nLink, and/or whether the trialing physician participated in a device manufacturer event before the trial can be utilized.

In embodiments, parameters based on the device representative or clinical specialist can be utilized, such as the representative or clinical specialist's years of experience.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Various embodiments of systems, devices, and methods have been described herein. These embodiments are given only by way of example and are not intended to limit the scope of the claimed embodiments. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed embodiments.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112 (f) are not to be invoked unless the specific terms "means for" or "step for" are recited in a claim.

What is claimed is:

1. A system for dynamically updating sacral neuromodulation therapy for a patient in real-time, the system comprising:
   an implanted sacral neuromodulation medical device configured to operate with therapy parameters comprising a therapy program, a therapy amplitude, a therapy battery charge consumption, a therapy stimulation "on" time, and an electrode impedance;
   a predictor including computing hardware of at least one processor and memory operably coupled to the at least one processor, the predictor operably coupled to the implanted sacral neuromodulation medical device; and
   instructions that, when executed on the predictor, cause the predictor to implement:
      an input/output engine configured to receive data from a plurality of distributed data sources, wherein the plurality of distributed data sources includes a digital health database operably coupled to the implanted sacral neuromodulation medical device,
      an aggregation engine configured to:
         generate a dynamically updated patient profile including a plurality of patient characteristics related to the patient from the digital health database, wherein the plurality of patient characteristics include patient activity data and patient symptom data sensed by one or more sensors associated with the implanted sacral neuromodulation medical device,
         generate at least one similar patient profile based on anonymized data from at least one of a plurality of other patients having characteristics similar to the plurality of patient characteristics, and
         generate a physician profile including a plurality of physician characteristics based on the data from the plurality of distributed data sources,
      wherein the physician profile corresponds to a physician treating the patient,
      a prediction engine configured to generate a recommendation for an updated sacral neuromodulation therapy corresponding to a change in at least one of the therapy parameters of the implanted sacral neuromodulation medical device, the recommendation based on:
         an evaluation of the dynamically updated patient profile compared to the at least one similar patient profile,
         an evaluation of data associated with the patient from the digital health database compared to a benchmark for the data associated with the patient, wherein the data associated with the patient includes patient activity data and patient symptom data sensed by the one or more sensors associated with the implanted sacral neuromodulation medical device,
         an evaluation of data associated with the physician compared to a benchmark for the data associated with the physician, and
         an evaluation of the physician profile compared to a plurality of other similar physician profiles, the plurality of other similar physician profiles being different than the generated physician profile, wherein the recommendation for the updated sacral neuromodulation therapy is based partially on one or more past recommendations implemented by one or more non-treating physicians corresponding to the plurality of other similar physician profiles; and an alerting engine configured to communicate an alert to the implanted sacral neuromodulation medical device based on the recommendation, wherein at least one of the therapy parameters of the implanted sacral neuromodulation medical device is updated in response to the recommendation communicated in the alert, thereby yielding a dynamically updated sacral neuromodulation therapy tailored to the patient, the updated sacral neuromodulation therapy based on real-time patient data and physician data stored in the plurality of distributed data sources, the real-time patient data including patient activity data and patient symptom data sensed by the one or more sensors associated with the implanted sacral neuromodulation medical device, and wherein the implanted sacral neuromodulation medical device is configured to apply the dynamically updated sacral neuromodulation therapy to the patient, wherein the one or more sensors are configured to sense patient activity data and patient symptom data responsive to the dynamically updated sacral neuromodulation therapy, and wherein the aggregation engine uses the responsive patient activity data and patient symptom data to generate the dynamically updated patient profile after application of the dynamically updated sacral neuromodulation therapy.

2. The system of claim 1, wherein the digital health database is operably coupled to the implanted sacral neuromodulation medical device through a handheld patient device including a digital application executing on the handheld patient device.

3. The system of claim 2, wherein the data associated with the patient is a programming status of the implanted sacral neuromodulation medical device.

4. The system of claim 3, wherein the programming status of the implanted sacral neuromodulation medical device is at least one of an on/off status of the implanted sacral neuromodulation medical device, a duration of "on" time with a program operating the implanted sacral neuromodulation medical device, a program operating the implanted sacral neuromodulation medical device, or the electrode impedance of the implanted sacral neuromodulation medical device.

5. The system of claim 2, wherein the data associated with the patient is a check of the therapy amplitude, and wherein the alert is transmitted to the handheld patient device to adjust the implanted sacral neuromodulation medical device therapy when a sensory and/or motor response is not recorded.

6. The system of claim 2, wherein the data associated with the patient is a number of therapy adjustments and the benchmark is a threshold number of therapy adjustments, wherein when the number of therapy adjustments exceeds the benchmark, the alert comprises:

a digital communication to the handheld patient device indicating the patient to wait; and in parallel, a digital communication to a caregiver device.

7. The system of claim 1, wherein the data associated with the patient is a patient perception of symptom relief.

8. The system of claim 7, wherein the patient perception of symptom relief is derived from sentiment expressed by the patient through an external data source.

9. The system of claim 1, wherein the recommendation is to optimize the therapy battery charge consumption parameter by customizing the therapy stimulation "on" time for the implanted sacral neuromodulation medical device.

10. The system of claim 9, wherein the data associated with the patient is a patient state, wherein the benchmark is a known state of patient symptom, and wherein the recommendation is further to turn the stimulation "on" during the patient state.

11. The system of claim 9, wherein the data associated with the patient is a time of a last symptom, and wherein the benchmark is a duration of time, and wherein the recommendation is further to turn the therapy stimulation "on" when the time of the last symptom exceeds the duration of time.

12. The system of claim 9, wherein the data associated with the patient is the electrode impedance of the implanted sacral neuromodulation medical device, wherein the benchmark is a threshold impedance level, and wherein the recommendation is further to update the implanted sacral neuromodulation medical device parameters, the updated implanted sacral neuromodulation medical device parameters being previously identified as an acceptable alternative.

13. The system of claim 1, wherein the data associated with the patient is the implanted sacral neuromodulation medical device being turned off, wherein the benchmark is a pre-defined duration of time, and wherein the alert comprises a digital communication to a caregiver device.

14. The system of claim 1, wherein the prediction engine is further configured to auto-check therapy, wherein the recommendation is an automatic adjustment of at least one of the therapy parameters, wherein the data associated with the patient is a previous status of the implanted sacral neuromodulation medical device, and wherein the benchmark is a threshold value related to the previous status based on the auto-check of therapy, and wherein the alert comprises a digital communication to a clinician to accept the automatic adjustment of at least one of the therapy parameters, and a communication to the implanted sacral neuromodulation medical device to adjust at least one of the therapy parameters according to the automatic adjustment.

15. A method of dynamically updating sacral neuromodulation therapy for a patient in real-time, the method comprising:

providing an implanted sacral neuromodulation medical device configured to operate with therapy parameters comprising a therapy program, a therapy amplitude, a therapy battery charge consumption, a therapy stimulation on time, and an electrode impedance;

providing a predictor including computing hardware of at least one processor and memory operably coupled to the at least one processor, the predictor operably coupled to the implanted sacral neuromodulation medical device;

receiving, by the predictor, data from a plurality of distributed data sources, wherein the plurality of distributed data sources includes a digital health database operably coupled to the implanted sacral neuromodulation medical device;

generating, by the predictor, a dynamically updated patient profile including a plurality of patient characteristics related to the patient from the digital health database, wherein the plurality of patient characteristics include patient activity data and patient symptom data sensed by one or more sensors associated with the implanted sacral neuromodulation medical device, generating, by the predictor, at least one similar patient profile based on anonymized data from at least one of a plurality of other patients having characteristics similar to the plurality of patient characteristics;

generating, by the predictor, a physician profile including a plurality of physician characteristics based on the data from the plurality of distributed data sources, wherein the physician profile corresponds to a physician treating the patient;

generating, by the predictor, a recommendation for an updated sacral neuromodulation therapy corresponding to a change in at least one of the therapy parameters of the implanted sacral neuromodulation medical device, the recommendation based on:

an evaluation of the dynamically updated patient profile compared to the at least one similar patient profile, an evaluation of data associated with the patient from the digital health database compared to a benchmark for the data associated with the patient, wherein the data associated with the patient includes patient activity data and patient symptom data sensed by the one or more sensors associated with the implanted sacral neuromodulation medical device, an evaluation of data associated with the physician compared to a benchmark for the data associated with the physician, and an evaluation of the physician profile compared to a plurality of other similar physician profiles, the plurality of other similar physician profiles being different than the generated physician profile, wherein the recommendation for the updated sacral neuromodulation therapy is based partially on one or more past recommendations implemented by one or more non-treating physicians corresponding to the plurality of other similar physician profiles;

communicating, by the predictor, an alert based on the recommendation, wherein at least one of the therapy parameters of the implanted sacral neuromodulation medical device is updated in response to the recommendation communicated in the alert, thereby yielding a dynamically updated sacral neuromodulation therapy tailored to the patient, the updated sacral neuromodulation therapy based on real-time patient data and physician data stored in the plurality of distributed data sources, the real-time patient data including patient activity data and patient symptom data sensed by the one or more sensors associated with the implanted sacral neuromodulation medical device; and operating the implanted sacral neuromodulation medical device to deliver the dynamically updated sacral neuromodulation therapy to the patient, wherein the one or more sensors are configured to sense patient activity data and patient symptom data responsive to the dynamically updated sacral neuromodulation therapy, and wherein the predictor uses the responsive patient activity data and patient symptom data to generate the dynamically updated patient profile after delivering the dynamically updated sacral neuromodulation therapy.

16. The method of claim 15, wherein the recommendation is to optimize the therapy battery charge consumption parameter by customizing the therapy stimulation "on" time for the implanted sacral neuromodulation medical device.

17. The method of claim 15, further comprising:

auto-checking therapy, wherein the recommendation is an automatic adjustment of at least one of the therapy parameters, wherein the data associated with the patient is a previous status of the implanted sacral neuromodulation medical device, and wherein the benchmark is a threshold value related to the previous status based on the auto-checking of therapy, and wherein the alert comprises a digital communication to a clinician to accept the automatic adjustment of at least one of the therapy parameters, and a communication to the implanted sacral neuromodulation medical device to adjust at least one of the therapy parameters according to the automatic adjustment.

* * * * *